United States Patent
Xu et al.

(10) Patent No.: US 11,190,618 B2
(45) Date of Patent: Nov. 30, 2021

(54) SCHEDULING METHOD, SCHEDULER, STORAGE MEDIUM, AND SYSTEM

(71) Applicant: HUAWEI TECHNOLOGIES CO., LTD., Guangdong (CN)

(72) Inventors: Cong Xu, Beijing (CN); Liu Liu, Beijing (CN); Haibo Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/021,425

(22) Filed: Sep. 15, 2020

(65) Prior Publication Data
US 2020/0412835 A1 Dec. 31, 2020

Related U.S. Application Data

(63) Continuation of application No. PCT/CN2019/074017, filed on Jan. 30, 2019.

(30) Foreign Application Priority Data

Mar. 23, 2018 (CN) .......................... 201810244746.5

(51) Int. Cl.
*H04L 29/08* (2006.01)
(52) U.S. Cl.
CPC ................... *H04L 67/327* (2013.01)
(58) Field of Classification Search
None
See application file for complete search history.

(56) References Cited

U.S. PATENT DOCUMENTS

| 7,496,912 B2 | 2/2009 | Keller et al. |
| 9,424,315 B2 | 8/2016 | Chamdani et al. |

(Continued)

FOREIGN PATENT DOCUMENTS

| CN | 101710286 A | 5/2010 |
| CN | 101916162 A | 12/2010 |

(Continued)

OTHER PUBLICATIONS

Ganesh Ananthanarayanan et al. Scarlett: Copingwith Skewed Content Popularity inMapReduce Clusters, 2011. pp. 287-300.
(Continued)

*Primary Examiner* — Jeffrey R Swearingen
(74) *Attorney, Agent, or Firm* — Womble Bond Dickinson (US) LLP

(57) ABSTRACT

This disclosure provides a scheduling method, a scheduler, a storage medium, and a system, and belongs to the field of communications technologies. The method includes: obtaining an association relationship diagram and data distribution information, where each node in the association relationship diagram indicates one piece of data, and each directed edge is used to indicate an operation request for obtaining, through calculation based on data indicated by a source node, data indicated by a destination node; sequentially positioning, according to a preset node sorting policy, an operation request corresponding to a traversed node to any server in which data indicated by the traversed node is located; and sequentially scheduling at least one operation request indicated by the at least one directed edge to a server to which the at least one operation request is positioned. The method could be used to reduce the cross-node data transmission, and improving calculation efficiency.

20 Claims, 16 Drawing Sheets

(56) References Cited

U.S. PATENT DOCUMENTS

| | | | |
|---|---|---|---|
| 10,606,640 B2* | 3/2020 | Cunha | G06F 9/5027 |
| 10,673,952 B1* | 6/2020 | Cohen | H04L 67/32 |
| 2007/0271381 A1 | 11/2007 | Wholey et al. | |
| 2010/0138388 A1 | 6/2010 | Wakeling et al. | |
| 2010/0217783 A1 | 8/2010 | Farver et al. | |
| 2012/0120920 A1 | 5/2012 | Zhang et al. | |
| 2015/0381731 A1* | 12/2015 | Grube | H04L 67/325 |
| | | | 709/224 |
| 2017/0192824 A1 | 7/2017 | Gupta et al. | |
| 2017/0329645 A1* | 11/2017 | Chen | H04L 41/0806 |
| 2018/0084039 A1* | 3/2018 | Wang | H04L 67/1023 |
| 2019/0012210 A1* | 1/2019 | Chen | G06F 9/4881 |
| 2020/0137151 A1* | 4/2020 | Chi | H04L 67/327 |
| 2020/0412835 A1* | 12/2020 | Xu | G06F 16/90335 |

FOREIGN PATENT DOCUMENTS

| | | | |
|---|---|---|---|
| CN | 102591712 B | 11/2013 | |
| CN | 104636204 A | 5/2015 | |
| CN | 105912383 A | 8/2016 | |
| CN | 106201356 A | 12/2016 | |
| CN | 106325756 A | 1/2017 | |
| CN | 106610866 A | 5/2017 | |
| CN | 106663075 A | 5/2017 | |
| CN | 107590254 A | 1/2018 | |
| CN | 107609652 A | 1/2018 | |
| CN | 107688488 A | 2/2018 | |
| WO | WO-2015085747 A1 * | 6/2015 | G06F 3/0649 |

OTHER PUBLICATIONS

Mohamed Y. Eltabakh et al. CoHadoop: Flexible Data Placement and Its Exploitation in Hadoop, Proceedings of the VLDB Endowment, vol. 4, No. 9, 2011. pp. 575-585.

Bo Wang et al. ActCap: Accelerating MapReduce on Heterogeneous Clusters with Capability-Aware Data Placement, 2015 IEEE. pp. 1328-1336.

Matei Zaharia et al. Delay Scheduling: A Simple Technique for Achieving, Locality and Fairness in Cluster Scheduling, EuroSys 10, Apr. 13 16, 2010, Paris, France. pp. 265-278.

Faraz Ahmad et al. Tarazu: Optimizing MapReduce On Heterogeneous Clusters, ASPLOS 12 Mar. 3-7, 2012, London, England, UK. pp. 61-74.

Faraz Ahmad et al.ShuffleWatcher: Shuffle-aware Scheduling in Multi-tenant MapReduce Clusters 2014 USENIX Annual Technical Conference, pp. 1-13.

Potat oes that are not doing business,"RDD dependency and directed acyclic graph DAG", Aug. 20, 2017, URL:https://blog.csdn.net/yyl 20170820 424525/article/details/7742 8801, total 12 pages.

Saravanan .M.S,"A simple process model generation using a new association rule mining algorithm and clustering approach", 2011 Third International Conference on Advanced Computing, Apr. 9, 2012, total 5 pages.

Zhengzheng Ge et al., "study on job scheduling algorithm in heterogeneous cluster environment", Jan. 2014, total:63pages.

* cited by examiner

SCHEDULING METHOD, SCHEDULER, STORAGE MEDIUM, AND SYSTEM

CROSS-REFERENCE TO RELATED APPLICATIONS

This application is a continuation of International Application No. PCT/CN2019/074017, filed on Jan. 30, 2019, which claims priority to Chinese Patent Application No. 201810244746.5, filed on Mar. 23, 2018, The disclosures of the aforementioned applications are hereby incorporated by reference in their entireties.

TECHNICAL FIELD

This disclosure relates to the field of communications technologies, and in particular, to a scheduling method, a scheduler, a storage medium, and a system.

BACKGROUND

Along with growth of a data scale and a development trend of data diversity, data analysis and processing technologies are also continuously improved. At present, a plurality of data analysis and processing architectures, for example, a Hadoop/MapReduce (distributed computing/mapping reduction) architecture and a big data processing framework Spark based on in-memory computing, have already emerged. Big data applications developed based on these data analysis and processing architectures can improve big data analysis and processing efficiency, and satisfy a real-time requirement of big data analysis and processing to some extent.

During specific implementation of a big data application, a computing cluster with a particular scale needs to be constructed, and a computing resource inside the computing cluster needs to be dynamically adjusted as required. To satisfy the foregoing requirements, a big data application is usually deployed in a cloud computing system. Unified management and more flexible management and scheduling can be implemented by using the cloud computing system. However, the cloud computing system brings many convenience conditions to big data applications, and is also confronted with many problems that need to be resolved urgently. Users are most concerned about a performance problem, namely, a problem of an overall operation execution time of the cloud computing system.

FIG. 1 shows a schematic architectural diagram of a cloud computing system. The cloud computing system includes an operation layer and a platform layer. The operation layer includes a scheduler. The platform layer includes a plurality of servers. The servers may be used as storage nodes to store data, and may further be used as compute nodes to perform calculation based on the stored data. At present, an operation layer scheduling policy is usually used in the cloud computing system, to be specific, terminals submit operation requests; the scheduler of the operation layer adds a plurality of received operation requests to a scheduling queue, sorts the plurality of operation requests in the scheduling queue according to a preset sorting policy, and sequentially schedules each operation request to a server in the ranking order; and the server to which the operation request is scheduled performs calculation based on the operation request and data corresponding to the operation request. However, in the foregoing scheduling process, a data storage location is fixed. In conclusion, a scheduling manner of fixed data and mobile computing is used in the cloud computing system.

A calculation process is affected by a data distribution status. For example, if data required by an operation request is distributed on different servers, when a server performs calculation based on the operation request, required data needs to be transmitted from another server. This causes cross-node data transmission. However, in the foregoing scheduling process, the data storage location is fixed, and a scheduling effect can depend only on an initial data distribution status. If the initial data distribution status is poor, a large amount of cross-node data transmission exists in the calculation process. Consequently, an operation execution time is excessively long, calculation efficiency is low, and performance of the cloud computing system is affected.

SUMMARY

This disclosure provides a scheduling method, a scheduler, a storage medium, and a system, to resolve the foregoing problem. The technical solutions are as follows:

According to a first aspect, a scheduling method is provided, and is applied to a scheduler in a cloud computing system; the cloud computing system includes the scheduler and a plurality of servers, and the plurality of servers are configured to store data; and the method includes:

obtaining an association relationship diagram and data distribution information, where the association relationship diagram includes a plurality of nodes and at least one directed edge, each node indicates one piece of data, each directed edge includes one source node and one destination node, the directed edge points from the source node of the directed edge to the destination node of the directed edge, the directed edge is used to indicate an operation request for obtaining, through calculation based on data indicated by the source node of the directed edge, data indicated by the destination node of the directed edge, and the data distribution information includes a server in which each piece of data is located;

traversing nodes in the association relationship diagram based on the association relationship diagram and the data distribution information and according to a preset node sorting policy, and sequentially positioning an operation request corresponding to a traversed node to any server in which data indicated by the traversed node is located, where the operation request corresponding to the node is an operation request indicated by a directed edge using the node as a source node; and sequentially scheduling at least one operation request indicated by the at least one directed edge to a server to which the at least one operation request is positioned.

In one embodiment, the preset node sorting policy is a policy of performing sorting in descending order of degrees, the degree is a quantity of directed edges connected to a node, and the traversing nodes in the association relationship diagram based on the association relationship diagram and the data distribution information and according to a preset node sorting policy, and sequentially positioning an operation request corresponding to a traversed node to any server in which data indicated by the traversed node is located includes:

traversing the nodes in the association relationship diagram according to the preset node sorting policy, and determining a current node with the largest degree in the association relationship diagram as the traversed node;

positioning an operation request corresponding to the traversed node to any server in which data indicated by the traversed node is located;

deleting a directed edge using the traversed node as a source node; and continuing to traverse nodes in the association relationship diagram according to the preset node sorting policy, determining a current node with the largest degree in the association relationship diagram as the traversed node, and performing the operation of positioning an operation request and the operation of deleting a corresponding directed edge for the traversed node until a degree of each node in the association relationship diagram is not greater than 1.

In another embodiment, before the obtaining an association relationship diagram and data distribution information, the method further includes:

obtaining a log record, where the log record includes an operation request record and a data processing record;

constructing a random queuing model based on the operation request record, and determining input data and output data for each operation request in the operation request record based on the random queuing model;

constructing a data association model based on the data processing record, where the data association model includes a plurality of nodes, and each node indicates one piece of data in the data processing record; and determining a source node corresponding to the input data and a destination node corresponding to the output data for each operation request; and adding, to the data association model, a directed edge pointing from the source node to the destination node, to obtain the association relationship diagram.

In another embodiment, before the obtaining an association relationship diagram and data distribution information, the method further includes:

calculating a quantity W of execution rounds required for completing execution of a plurality of operation requests in the operation request record;

calculating a priority degree of each operation request based on operation execution frequency and an operation execution time of each operation request, where the priority degree is positively correlated with the operation execution frequency and the operation execution time; and sorting the plurality of operation requests in descending order of the priority degrees, and determining that execution rounds of an operation request ranking in the $(nW+m)^{th}$ and an operation request ranking in the $((n+2)W+1-m)^{th}$ are an $m^{th}$ execution round, where m is a positive integer, m is not greater than W, and n is an integer; and the sequentially scheduling at least one operation request indicated by the at least one directed edge to a server to which the at least one operation request is positioned includes: sequentially scheduling, based on an execution round of each operation request, the at least one operation request to the server to which the at least one operation request is positioned.

In another embodiment, the method further includes:

initializing a cluster scale of each operation request, where a quantity of servers occupied by data corresponding to the operation request is positively correlated with the cluster scale of the operation request;

calculating an operation execution time of each operation request in the current cluster scale, and increasing a cluster scale of an operation request with the longest operation execution time; and continuing to calculate an operation execution time of each operation request in the current cluster scale, and increasing a cluster scale of an operation request with the longest operation execution time, until a quantity of servers corresponding to the cluster scale of the operation request with the longest operation execution time is equal to a total quantity of servers in the cloud computing system.

In another embodiment, each operation request includes a map task, a shuffle task, and a reduce task, and the calculating an operation execution time of each operation request in the current cluster scale includes:

calculating an operation execution time of any operation request in the current cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B},$$

where $L_j(r)$ represents an operation execution time of a $j^{th}$ operation request, r represents a quantity of racks currently allocated to the $j^{th}$ operation request, k represents a quantity of servers in a rack, $S_j^I$ represents a size of an input file of the $j^{th}$ operation request, $S_j^O$ represents a size of an output file of the $j^{th}$ operation request, $S_j^S$ represents a size of a shuffle file of the $j^{th}$ operation request, $\mu_{map}$ represents single machine average processing efficiency of a map task, $\mu_{reduce}$ represents single machine average processing efficiency of a reduce task, $N_j^R$ represents a quantity of reduce tasks of the $j^{th}$ operation request, V represents an over subscription ratio, and B represents a bandwidth of the server.

In another embodiment, after the continuing to calculate an operation execution time of each operation request in the current cluster scale, and increasing a cluster scale of an operation request with the longest operation execution time, until a quantity of servers corresponding to the cluster scale of the operation request with the longest operation execution time is equal to a total quantity of servers in the cloud computing system, the method further includes:

determining a current relationship chain having the longest length in the association relationship diagram, where the relationship chain is a set including a first node and nodes and directed edges that are passed through by any second node to the first node; the first node is a node that has no directed edge using the first node as a source node; and the second node is a node that has at least two directed edges using the second node as a source node, or is a node that has a directed edge using the second node as a source node and has no directed edge using the second node as a destination node; and the length of the relationship chain is determined by a quantity of directed edges included in the relationship chain;

sorting, in descending order of the cluster scales, operation requests indicated by directed edges in the current relationship chain having the longest length, and determining an operation request with the largest cluster scale as a specified operation request;

positioning, based on the cluster scale of the specified operation request, data corresponding to the specified operation request to servers whose quantity matches the cluster scale of the specified operation request; and positioning, based on a cluster scale of an operation request indicated by another directed edge in the current relationship chain having the longest length, data corresponding to the another operation request to servers to which the specified operation request is positioned and whose quantity matches the cluster scale of the another operation request;

deleting the current relationship chain having the longest length; and continuing to determine a current relationship chain having the longest length in the association relationship diagram, and performing the operation of positioning data for the determined relationship chain, until positioning of data corresponding to an operation request indicated by each directed edge in the association relationship diagram is complete.

In another embodiment, the method further includes:

updating the log record after the operation request is executed, where the log record includes the operation request record and the data processing record; and updating the association relationship diagram based on an updated log record.

In another embodiment, a quantity of requests of each directed edge in the association relationship diagram indicates a quantity of corresponding operation requests, a weight of each directed edge indicates execution frequency of the corresponding operation request, and the updating the association relationship diagram based on an updated log record includes:

determining a plurality of updated operation requests and execution frequency of each updated operation request based on an updated operation request record;

updating the directed edges in the association relationship diagram based on the plurality of updated operation requests, and updating the quantity of requests of each directed edge; and updating the weight of each directed edge in the association relationship diagram based on the execution frequency of each updated operation request.

According to a second aspect, a scheduler is provided, and is applied to a cloud computing system; the cloud computing system includes the scheduler and a plurality of servers, and the plurality of servers are configured to store data; and the scheduler includes:

an obtaining module, configured to obtain an association relationship diagram and data distribution information, where the association relationship diagram includes a plurality of nodes and at least one directed edge, each node indicates one piece of data, each directed edge includes one source node and one destination node, the directed edge points from the source node of the directed edge to the destination node of the directed edge, the directed edge is used to indicate an operation request for obtaining, through calculation based on data indicated by the source node, data indicated by the destination node of the directed edge, and the data distribution information includes a server in which each piece of data is located;

a request positioning module, configured to: traverse nodes in the association relationship diagram based on the association relationship diagram and the data distribution information and according to a preset node sorting policy, and sequentially position an operation request corresponding to a traversed node to any server in which data indicated by the traversed node is located, where the operation request corresponding to the node is an operation request indicated by a directed edge using the node as a source node; and a scheduling module, configured to sequentially schedule at least one operation request indicated by the at least one directed edge to a server to which the at least one operation request is positioned.

In one embodiment, the preset node sorting policy is a policy of performing sorting in descending order of degrees, the degree is a quantity of directed edges connected to a node, and the request positioning module includes:

a determining unit, configured to: traverse the nodes in the association relationship diagram according to the preset node sorting policy, and determine a current node with the largest degree in the association relationship diagram as the traversed node;

a positioning unit, configured to position an operation request corresponding to the traversed node to any server in which data indicated by the traversed node is located; and a deletion unit, configured to delete a directed edge using the traversed node as a source node, where the determining unit, the positioning unit, and the deletion unit are further configured to: continue to traverse nodes in the association relationship diagram according to the preset node sorting policy, determine a current node with the largest degree in the association relationship diagram as the traversed node, and perform the operation of positioning an operation request and the operation of deleting a corresponding directed edge for the traversed node until a degree of each node in the association relationship diagram is not greater than 1.

In another embodiment, the scheduler further includes:

a log obtaining module, configured to obtain a log record, where the log record includes an operation request record and a data processing record;

a model construction module, configured to: construct a random queuing model based on the operation request record, and determine input data and output data for each operation request in the operation request record based on the random queuing model; and a data association model construction module, configured to: construct a data association model based on the data processing record, where the data association model includes a plurality of nodes, and each node indicates one piece of data in the data processing record; and determine a source node corresponding to the input data and a destination node corresponding to the output data for each operation request, and add, to the data association model, a directed edge pointing from the source node to the destination node, to obtain the association relationship diagram.

In another embodiment, the scheduler further includes:

a round quantity calculation module, configured to calculate a quantity W of execution rounds required for completing execution of a plurality of operation requests in the operation request record;

a priority degree calculation module, configured to calculate a priority degree of each operation request based on operation execution frequency and an operation execution time of each operation request, where the priority degree is positively correlated with the operation execution frequency and the operation execution time; and a round determining module, configured to: sort the plurality of operation requests in descending order of the priority degrees, and determine that execution rounds of an operation request ranking in the $(nW+m)^{th}$ and an operation request ranking in the $((n+2)W+1-m)^{th}$ are an $m^{th}$ execution round, where m is a positive integer, m is not greater than W, and n is an integer, where the scheduling module is further configured to sequentially schedule, based on an execution round of each operation request, the at least one operation request to the server to which the at least one operation request is positioned.

In another embodiment, the scheduler further includes:

a cluster scale setting module, configured to initialize a cluster scale of each operation request, where a quantity of servers occupied by data corresponding to the operation request is positively correlated with the cluster scale of the operation request; and a cluster scale adjustment module, configured to: calculate an operation execution time of each operation request in the current cluster scale, and increase a cluster scale of an operation request with the longest operation execution time; and continue to calculate an operation execution time of each operation request in the current cluster scale, and increase a cluster scale of an operation request with the longest operation execution time, until a quantity of servers corresponding to the cluster scale of the operation request with the longest operation execution time is equal to a total quantity of servers in the cloud computing system.

In another embodiment, each operation request includes a map task, a shuffle task, and a reduce task, and the cluster scale adjustment module is further configured to calculate an operation execution time of any operation request in the current cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B},$$

where $L_j(r)$ represents an operation execution time of a $j^{th}$ operation request, r represents a quantity of racks currently allocated to the $j^{th}$ operation request, k represents a quantity of servers in a rack, $S_j^I$ represents a size of an input file of the $j^{th}$ operation request, $S_j^O$ represents a size of an output file of the $j^{th}$ operation request, $S_j^S$ represents a size of a shuffle file of the $j^{th}$ operation request, $\mu_{map}$ represents single machine average processing efficiency of a map task, $\mu_{reduce}$ represents single machine average processing efficiency of a reduce task, $N_j^R$ represents a quantity of reduce tasks of the $j^{th}$ operation request, V represents an over subscription ratio, and B represents a bandwidth of the server.

In another embodiment, the scheduler further includes:

a sorting module, configured to: determine a current relationship chain having the longest length in the association relationship diagram, where the relationship chain is a set including a first node and nodes and directed edges that are passed through by any second node to the first node; the first node is a node that has no directed edge using the first node as a source node; and the second node is a node that has at least two directed edges using the second node as a source node, or is a node that has a directed edge using the second node as the source node and has no directed edge using the second node as a destination node; and the length of the relationship chain is determined by a quantity of directed edges included in the relationship chain; and sort, in descending order of the cluster scales, operation requests indicated by directed edges in the current relationship chain having the longest length, and determine an operation request with the largest cluster scale as a specified operation request;

a data positioning module, configured to: position, based on the cluster scale of the specified operation request, data corresponding to the specified operation request to servers whose quantity matches the cluster scale of the specified operation request; and position, based on a cluster scale of an operation request indicated by another directed edge in the current relationship chain having the longest length, data corresponding to the another operation request to servers to which the specified operation request is positioned and whose quantity matches the cluster scale of the another operation request; and a deletion module, configured to delete the current relationship chain having the longest length, where the sorting module, the data positioning module, and the deletion module are further configured to: continue to determine a current relationship chain having the longest length in the association relationship diagram, and perform the operation of positioning data for the determined relationship chain, until positioning of data corresponding to an operation request indicated by each directed edge in the association relationship diagram is complete.

In another embodiment, the scheduler further includes:

an update module, configured to update the log record after the operation request is executed, where the log record includes the operation request record and the data processing record, where the update module is further configured to update the association relationship diagram based on an updated log record.

In another embodiment, a quantity of requests of each directed edge in the association relationship diagram indicates a quantity of corresponding operation requests, a weight of each directed edge indicates execution frequency of the corresponding operation request, and the update module includes:

a first update unit, configured to determine a plurality of updated operation requests and execution frequency of each updated operation request based on an updated operation request record;

a second update unit, configured to: update the directed edges in the association relationship diagram based on the plurality of updated operation requests, and update the quantity of requests of each directed edge; and a third update unit, configured to update the weight of each directed edge in the association relationship diagram based on the execution frequency of each updated operation request.

According to a third aspect, a scheduler is provided. The scheduler includes at least one processor and a memory, where the memory stores at least one instruction, and the instruction is loaded and executed by the at least one processor to implement the operations performed in the method according to the first aspect.

According to a fourth aspect, a computer-readable storage medium is provided. The computer-readable storage medium stores at least one instruction, and the instruction is loaded and executed by a processor to implement the operations performed in the method according to the first aspect.

According to a fifth aspect, a computer program is provided. The computer program is executed by a processor or a computer to implement the operations performed in the method according to the first aspect.

According to a sixth aspect, a cloud computing system is provided. The cloud computing system includes a plurality of servers and the scheduler according to the second aspect or the third aspect.

Beneficial effects of embodiments of this disclosure are:

According to the method provided in the embodiments of this disclosure, the association relationship diagram is used to indicate an association relationship between data and a correspondence between an operation request and the data, and the data distribution information is used to indicate a data distribution status, so that each node is traversed based on the association relationship diagram and the data distribution information, and the operation request indicated by the directed edge using the traversed node as the source node is positioned to the any server in which the data indicated by the traversed node is located. Therefore, the operation request is positioned, features of a platform layer and an operation layer are fully utilized, and an information gap between cross-layer schedulers is broken, sensing and an association between cross-layer resources are enhanced, and cross-node data transmission can be reduced, thereby shortening an overall operation execution time of the operation request, improving calculation efficiency, improving system performance, and optimizing and integrating all platform resources.

In addition, the association relationship diagram is generated based on the operation request record and the data processing record. The association relationship diagram can indicate a cross-layer dependency relationship between the operation layer and the platform layer, and has both a static feature of a data flow and a dynamic feature of an operation flow. When scheduling is performed based on the association relationship diagram, the sorting policy of the operation requests and the data distribution status can be fully considered, so that a proper scheduling policy is formulated, thereby reducing the operation execution time, improving the calculation efficiency, and improving the performance of the cloud computing system.

In addition, the association relationship diagram is updated, so that the association relationship diagram can be updated in time with execution of the process of scheduling the operation request, to ensure that the association relationship diagram matches an operation flow change in time, so that a burst status of the operation request can be responded in a more timely manner. This is applicable to a scenario in which an operation flow is relatively stable, and is also applicable to a scenario in which an operation flow burst phenomenon occurs frequently, for example, a node fault, a network line change, adding of a new-type application, or a transient operation request burst, thereby improving an anti-burst capability.

In addition, the cluster scale of each operation request is initialized and then adjusted based on the operation execution time, so that a current cluster scale of an operation request with the longest operation execution time can be continuously adjusted, thereby increasing a concurrency degree of the operation request, reducing the operation execution time of the operation request, and further unifying the operation execution time of each of the plurality of operation requests.

In addition, considering that data in a same relationship chain has an association relationship, the data may be used at the same time in an operation execution process. Therefore, the data that may be used at the same time is positioned to a same server by using the association relationship between the data, to facilitate subsequent data processing, so that optimal data distribution with extremely high precision is implemented, data transmission between different servers is avoided as much as possible, communication overheads are optimized, a waste of a communication capability is reduced, and a computing capability and a communication capability of a big data service are optimized. In addition, a data scheduling policy and an operation scheduling policy are combined by using the association relationship diagram, so that a cross-layer association relationship between the data and the operation request is fully used, and coordinated scheduling of an operation flow and a data flow can be implemented, thereby optimizing integration of global resources. In addition, considering that the association relationship diagram includes a plurality of relationship chains, an association relationship is relatively complex, and a longer length of the relationship chain indicates higher complexity, and indicates greater impact of the data distribution status on overall system performance. Therefore, the relationship chains are sorted based on lengths of the relationship chains, and a relationship chain having the longest length is preferentially positioned, thereby reducing positioning complexity, and avoiding impact caused by improper data distribution on a subsequent data processing process as much as possible.

In addition, considering that a node with a relatively large degree corresponds to a relatively large quantity of operation requests, and an association relationship is relatively complex, as many operation requests as possible can be positioned to a server in which data indicated by the node is located only after the node with the relatively large degree is preferentially positioned. Therefore, nodes are sorted based on degrees of the nodes, and an operation request corresponding to a node with the largest degree is preferentially positioned, thereby reducing positioning complexity, completing one-to-one mapping between the operation request and the data, and avoiding the impact caused by the improper data distribution on the subsequent data processing process as much as possible.

In addition, the plurality of operation requests are sorted in descending order of the priority degrees, it is determined that the execution rounds of the operation request ranking in the $(nW+m)^{th}$ and the operation request ranking in the $((n+2)W+1-m)^{th}$ are the $m^{th}$ execution round, and the at least one operation request is sequentially scheduled, based on the execution round of each operation request, to the server to which the at least one operation request is positioned, so that it can be ensured that a difference between priority degrees of operation requests executed in different rounds is not large, and after scheduling of the operation requests in each 2W rounds is complete, overall scales of the operation requests in all the rounds are approximately equal. Therefore, the operation requests are approximately tiled on all racks of the cloud computing system.

In addition, the execution round of each operation request is initialized by using a heuristic method, so that operation requests executed in parallel in each round can occupy all cluster capabilities, thereby avoiding a waste of the computing capability and improving execution efficiency.

DESCRIPTION OF EMBODIMENTS

To make the objectives, technical solutions, and advantages of this disclosure clearer, the following further describes embodiments of this disclosure in detail with reference to the accompanying drawings.

Figure 1:
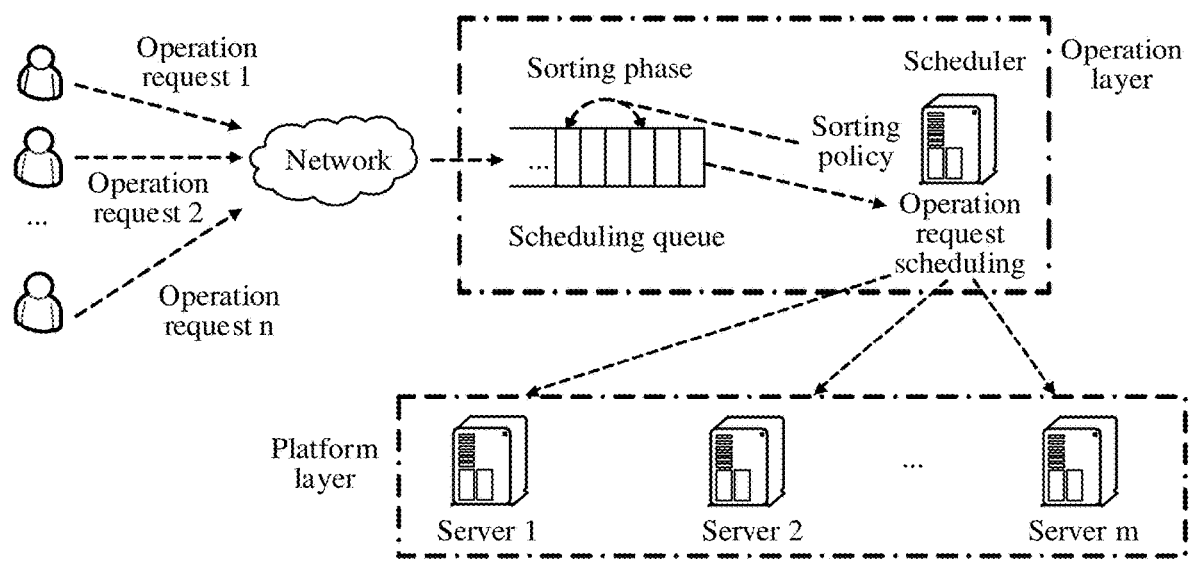
FIG. 1 is a schematic architectural diagram of a cloud computing system in the related art.
Figure 2:
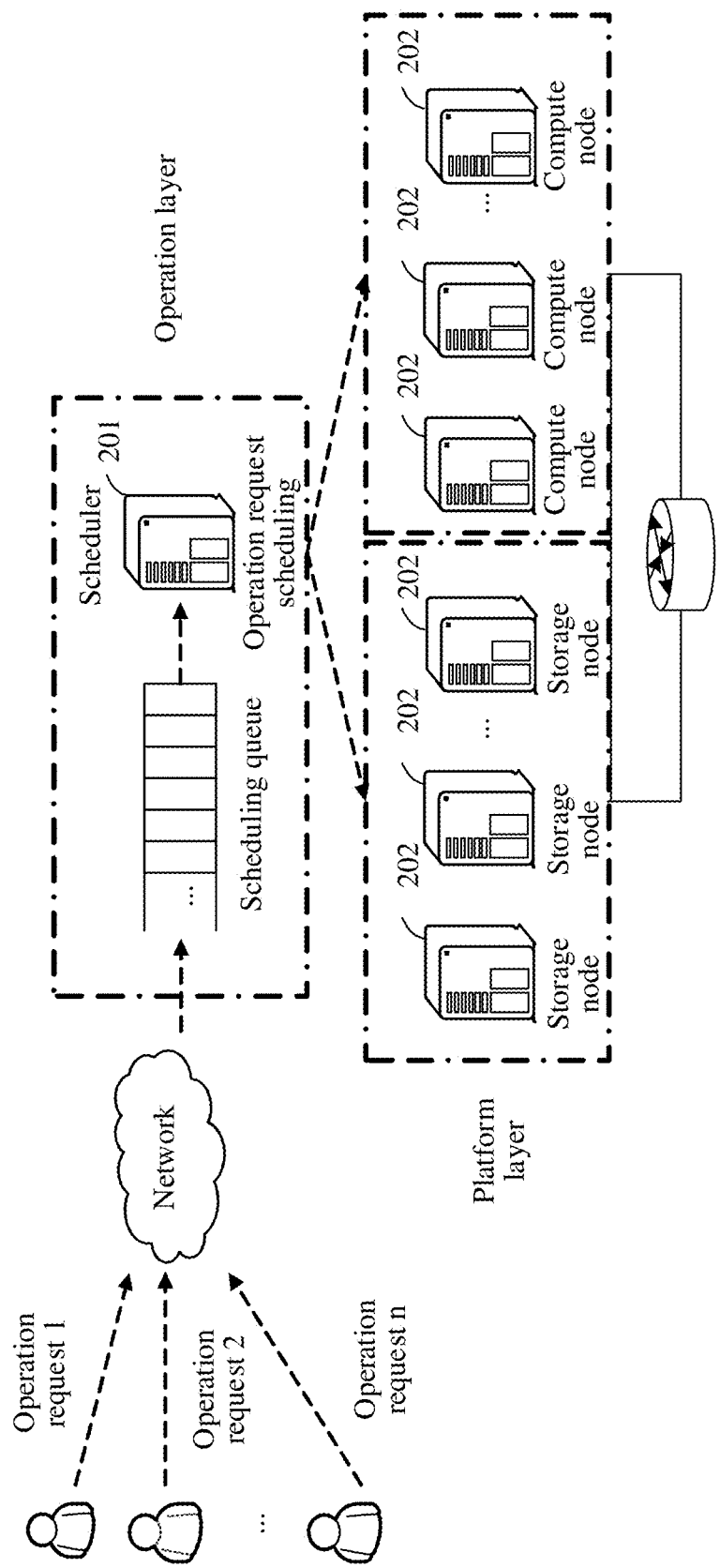
FIG. 2 is a schematic architectural diagram of a cloud computing system according to an embodiment of this disclosure.

FIG. 2 is a schematic architectural diagram of a cloud computing system according to an embodiment of this disclosure. Referring to FIG. 2, the cloud computing system includes an operation layer and a platform layer. The operation layer includes a scheduler 201, and the platform layer includes a plurality of servers 202.

The plurality of servers 202 are used as storage nodes to store data, and are further used as compute nodes to perform calculation based on data and an operation request. The plurality of servers 202 are connected to each other, and may perform data transmission.

The scheduling layer 201 is configured to schedule a received operation request to one or more compute nodes (one or more servers 202), to perform calculation on the compute node based on data and the operation request.

Therefore, after accessing the operation layer, a device such as user equipment or an application server may submit an operation request to the operation layer, and the operation request is used to perform calculation based on corresponding data. The scheduler 201 stores a received operation request in a scheduling queue, and schedules the operation request to the server 202 from the scheduling queue, to perform calculation in the server 202 based on the scheduled operation request and data corresponding to the operation request.

Figure 3:
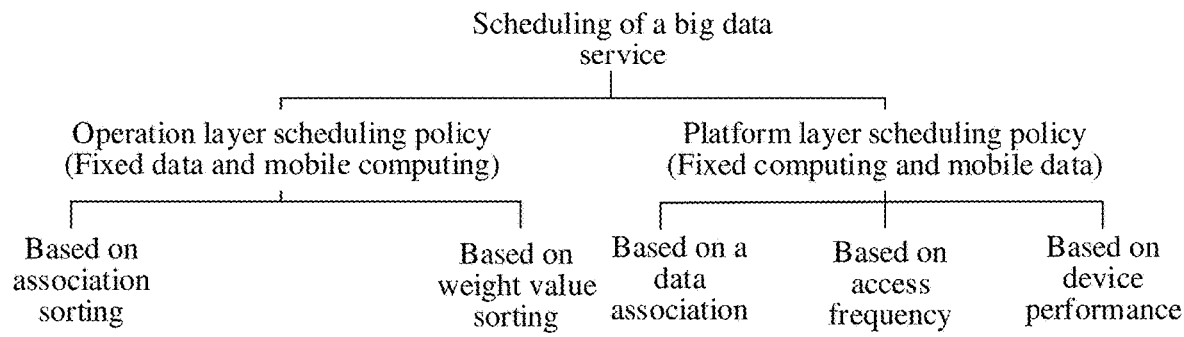
FIG. 3 is a schematic diagram of a scheduling policy in the related art.

In a scheduling solution in the related art, data scheduling on a platform layer and operation request scheduling on an operation layer are black boxes for each other and are insensitive to each other. Referring to FIG. 3, used scheduling policies include two types: an operation layer scheduling policy and a platform layer scheduling policy.

The operation layer scheduling policy uses a scheduling manner of fixed data and mobile computing, to be specific, a data storage location is fixed. A scheduler of the operation layer sorts a plurality of operation requests in a scheduling queue according to a preset sorting policy, and sequentially schedules each operation request to a server in the ranking order; and the server to which the operation request is scheduled performs calculation based on the operation request and data corresponding to the operation request. The operation layer scheduling policy includes an association-based sorting policy, a weight value-based sorting policy, or the like.

In the operation layer scheduling policy, it is assumed that data distribution complies with default uniform distribution or known distribution, and it is assumed that data distribution remains constant in an entire scheduling process. Therefore, the operation layer scheduling policy is insensitive to a real-time distribution status of underlying data in the scheduling process. Consequently, a scheduling effect is usually affected by initial data distribution. However, because a complex cross-layer association relationship exists between data and an operation request, a scheduling result is further affected. If an initial data distribution status is poor, even if load balancing between servers can be implemented by using the operation layer scheduling policy, a large amount of cross-node data transmission is still caused, and overall operation execution efficiency is still affected. In a high-heterogeneous cluster environment, a pure operation layer scheduling policy cannot achieve a perfect resource distribution effect.

The platform layer scheduling policy uses a scheduling manner of fixed computing and mobile data, to be specific, a data association relationship is introduced. In a process of executing an operation request, data read by a same operation request at the same time is determined, and then the data is associated. Then, a conventional uniform data distribution solution is changed, the associated data is deployed in a same server, so that dynamic adjustment of data distribution is implemented, a localization degree of the data under specific operation flow distribution is optimized, and cross-node data transmission is reduced as much as possible in the process of executing the operation request, thereby improving performance of a big data service. The platform layer scheduling policy includes a data association-based scheduling policy, a data access frequency-based scheduling policy, a device performance-based scheduling policy, or the like.

Because overheads of mobile data are higher than those of mobile computing, once a data distribution status is determined by using the platform layer scheduling policy, the data distribution status is not frequently adjusted within a short time. This feature causes poor flexibility of the platform layer scheduling policy. In addition, the platform layer scheduling policy is insensitive to a status of an operation flow, and therefore cannot match a change of the operation flow in time, and cannot adjust the data distribution status in time based on a burst status of the operation flow. Consequently, the performance of the big data service is deteriorated, and the platform layer scheduling policy is usually not applicable to a scenario in which an operation flow burst phenomenon frequently occurs, and is applicable to only a scenario in which a user behavior is relatively stable, to be specific, an operation flow is relatively stable.

However, in this embodiment of this disclosure, a gap between the scheduling policies of the platform layer and the operation layer is broken, and coordinated scheduling is performed on an operation flow and a data flow based on the cross-layer association relationship between the data and the operation request, thereby further optimizing and integrating global resources, and improving the execution efficiency. Compared with the operation layer scheduling policy, a platform layer factor is integrated in this embodiment of this disclosure, so that the scheduling policy has better stable performance. However, compared with the platform layer scheduling policy, a burst feature of an operation flow is considered in this embodiment of this disclosure, so that transient convergence is stronger. In addition, compared with a simple combination of the two policies, in this embodiment of this disclosure, the cross-layer association relationship between the data and the operation request is fully used, so that the data distribution is optimized, and communication overheads in an operation execution process are reduced.

This embodiment of this disclosure is applied to an application scenario of a large-scale data center. In the large-scale data center, a plurality of devices perform big data services in parallel, and submit a plurality of operation requests. In addition, data and an operation frequently interact with each other. Therefore, uniform planning and scheduling may be performed on flow directions of the operation requests and the data in an entire operation execution process by using the scheduling policy in this embodiment of this disclosure.

When a big data application is invoked in the cloud computing system, a process from arrival of an operation request to completion of execution of the operation request includes three phases: scheduling of the operation request, data loading, and execution of the operation request. Time consumed by execution of the three phases determines overall performance of the big data application.

Work of the platform layer is in a data loading phase, and research of the platform layer mainly provides a corresponding deployment policy for data of the application on a storage platform. An optimized deployment solution in which data of the platform layer is on the storage platform can improve loading rates of data of the big data application to different compute nodes and optimize a time span of a data loading phase.

Work of the operation layer is in an operation request scheduling phase, and research of the operation layer is mainly to schedule an operation request based on performance requirements and constraint conditions of different services. On a basis that data distribution is optimized on the platform layer, the operation request scheduling policy of the operation layer further plans an execution order of a plurality of operation requests and a manner of dispatching the operation request to a node in which data is located.

Figure 4A:
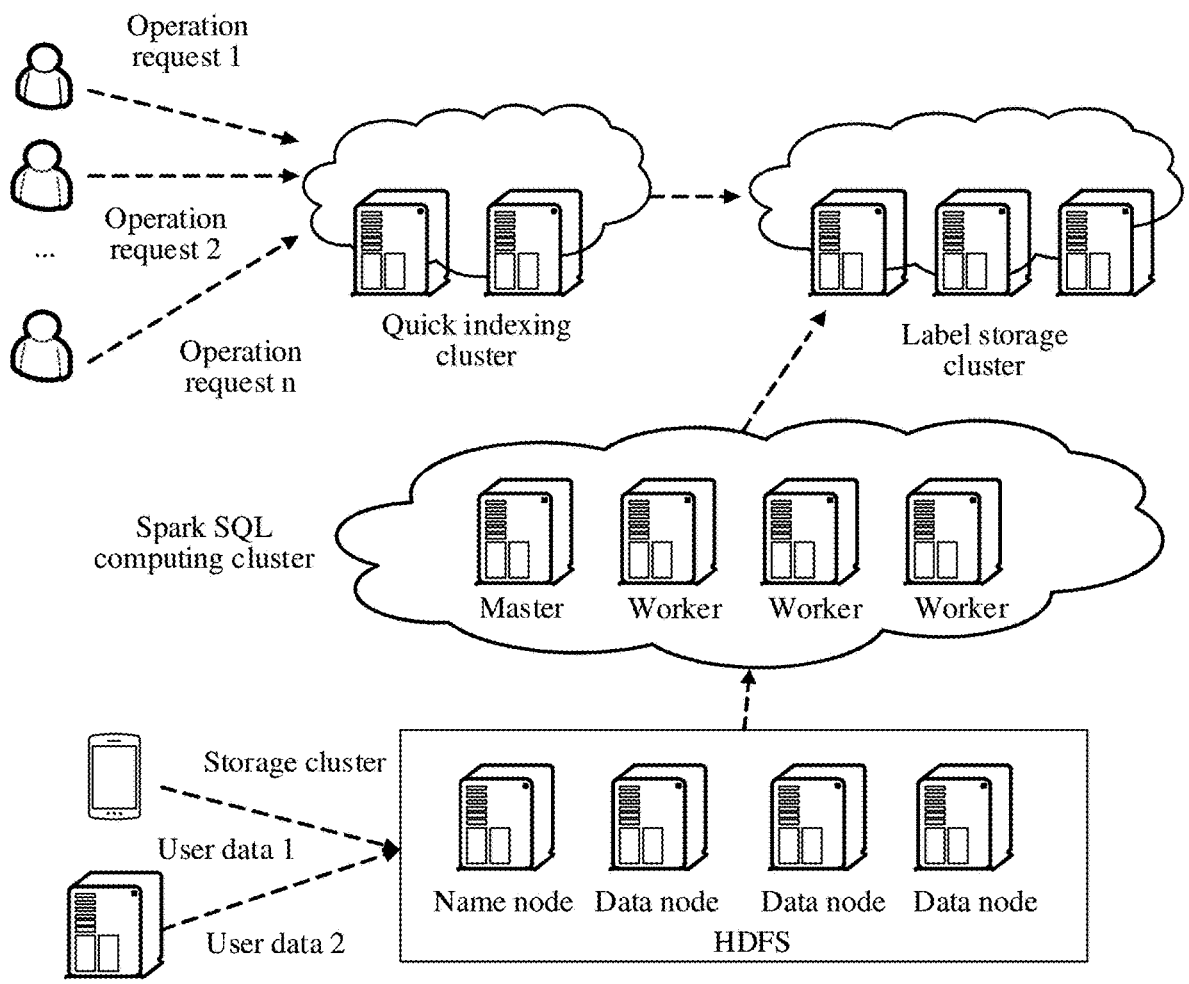
FIG. 4A is a schematic architectural diagram of a terminal user profile system according to an embodiment of this disclosure.

For example, referring to FIG. 4A, the embodiments of this disclosure may be applied to a terminal user profile system. In a working process of the terminal user profile system, user data needs to be stored in different formats such as a Hadoop distributed file system (HDFS) file, a Hive (a Hadoop-based data warehouse tool) table, and a Redis (a key-value storage system) index, and the data flows very frequently. In addition, the data in the different formats needs to be read by a Spark SQL computing cluster (a spark component configured to process structured data), and different types of big data operations, for example, operations such as entry generation, label generation, and application recommendation, are performed. Therefore, a complex association relationship is formed between an application and data. An HDFS includes a name node and a data node, and the Spark SQL computing cluster includes a master node and a worker node. The method provided in this embodiment of this disclosure is applicable to this scenario, to perform uniform scheduling and management on a data flow and an operation flow.

Figure 4B:
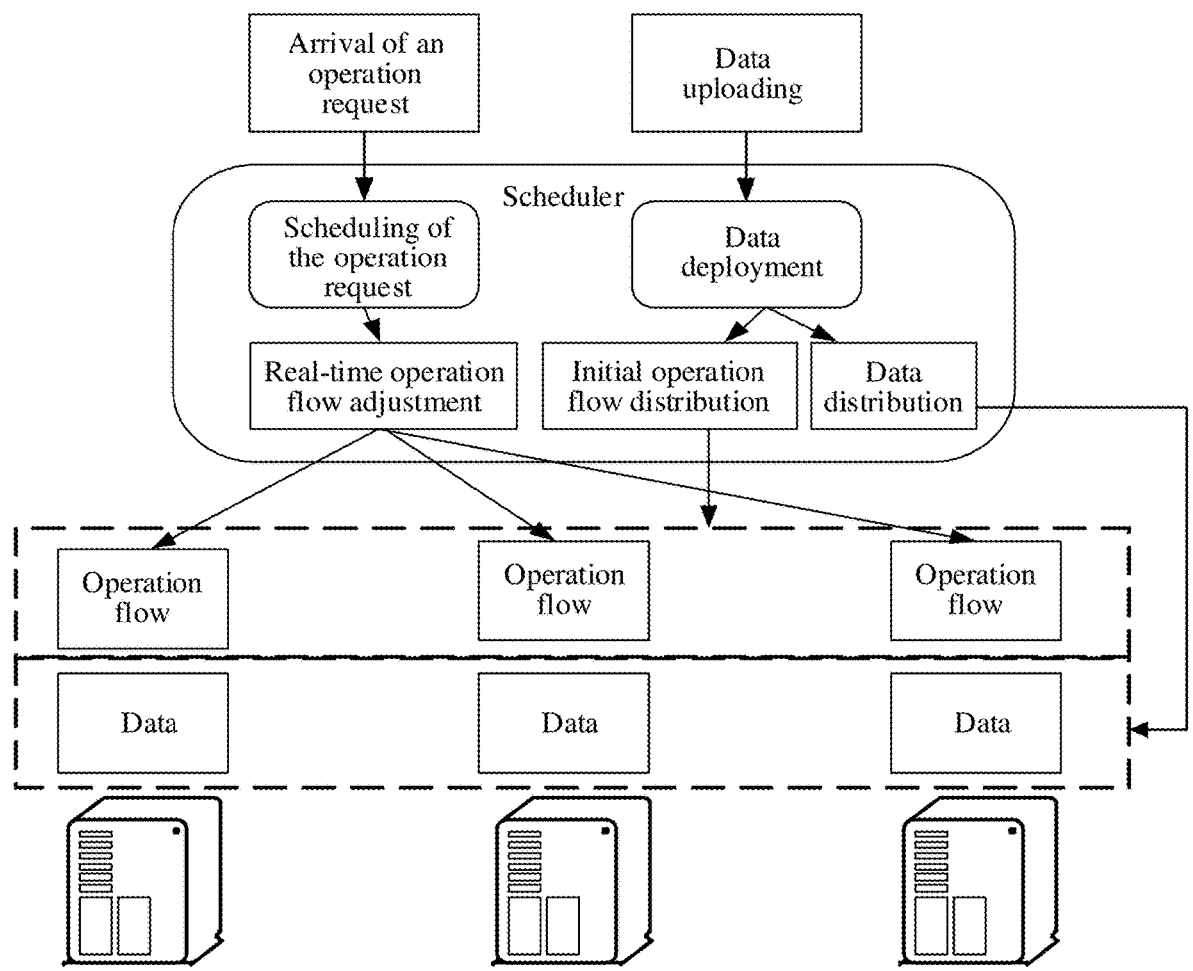
FIG. 4B is a schematic structural diagram of a scheduler according to an embodiment of this disclosure.

Referring to FIG. 4B, a scheduling method in an embodiment of this disclosure may be implemented by expanding a classical scheduler, such as an Apache Hadoop YARN or an Apache Mesos, in an existing big data system. An operation request scheduling function of a conventional scheduler is mainly reserved in the conventional scheduler as a submodule of a new scheduler. In addition, a feature of a data plane is added, and a submodule having a data deployment function is introduced. Two submodules do not interfere with each other and work independently, and information used by the two submodules is closely associated by introducing a cross-layer fine granularity association relationship diagram on a bottom layer. Therefore, operation of the two submodules may be planned in a unified manner, and coordinated scheduling of a data flow and an operation flow is implemented, thereby implementing globally optimal combined scheduling. For example, if an underlying environment of the entire cloud computing system is the HDFS, this embodiment of this disclosure may be implemented by modifying and expanding the scheduler Apache Hadoop YARN. For details of a specific process of this embodiment of this disclosure, refer to the following embodiment.

Figure 5:
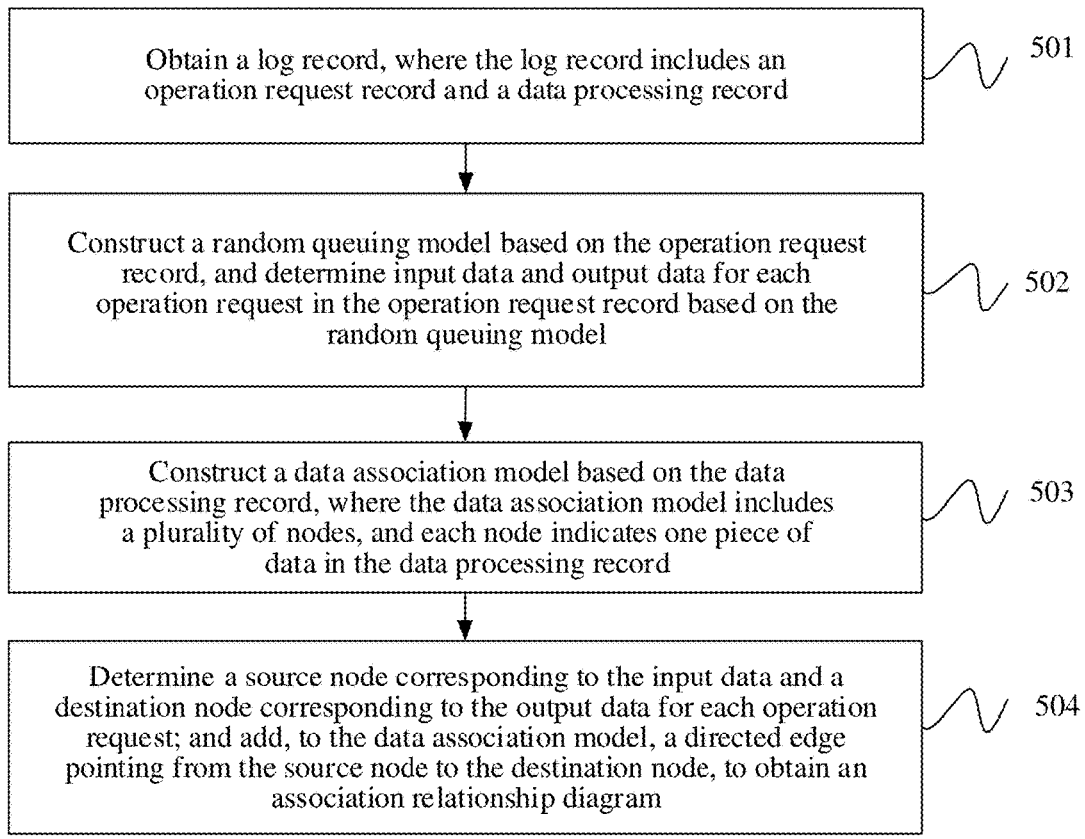
FIG. 5 is a flowchart of a scheduling method according to an embodiment of this disclosure.

FIG. 5 is a flowchart of a scheduling method according to an embodiment of this disclosure. The scheduling method is applied to the scheduler shown in the foregoing embodiment. In this embodiment of this disclosure, a process of obtaining an association relationship diagram is described. Referring to FIG. 5, the method includes the following operations.

501: Obtain a log record, where the log record includes an operation request record and a data processing record.

The operation request record includes an operation request that needs to be executed in a current operation execution process. Based on different types of functions provided by a big data application, the operation request record may include different types of operation requests, for example, an application recommendation request and a web page browsing request. In addition, the operation request record may further include request frequency of each operation request, an execution time of each operation request, and the like. These parameters may be obtained by collecting statistics about a historical execution process of each operation request.

The data processing record includes a plurality pieces of data. Based on the data processing record, not only data that has been previously processed can be determined, but also the data can be considered as data required in the current operation execution process.

When receiving an operation request each time, the scheduler may store the operation request in the operation request record, for example, store the received operation request in a scheduling queue. In addition, the scheduler may further generate a data processing record based on the processed data in the operation execution process.

502: Construct a random queuing model based on the operation request record, and determine input data and output data for each operation request in the operation request record based on the random queuing model.

After reading the operation request record, the scheduler may perform abstract modeling on an operation request execution process based on the operation request record, to construct the random queuing model. The random queuing model may simulate a process in which a plurality of operation requests wait in queue for being executed. In this case, the input data and the output data of each operation request may be determined based on the random queuing model, the input data is data required when the operation request is executed, and the output data is data obtained after the input data is calculated based on the operation request.

503: Construct a data association model based on the data processing record, where the data association model includes a plurality of nodes, and each node indicates one piece of data in the data processing record.

504: Determine a source node corresponding to the input data and a destination node corresponding to the output data for each operation request; and add, to the data association model, a directed edge pointing from the source node to the destination node, to obtain an association relationship diagram.

The scheduler may use each piece of data in the data processing record as one node, to construct the data association model including the plurality of nodes. The data association model may indicate an association relationship between data, and each operation request has, in the data association model, the source node corresponding to the input data and the destination node corresponding to the output data. Therefore, the directed edge pointing from the source node corresponding to each operation request to the destination node is added to the data association model, and the directed edge is used to indicate an operation request for obtaining, through calculation based on the input data corresponding to the source node, the output data corresponding to the destination node, to be specific, the directed edge may indicate an association relationship between the input data and the output data.

After the directed edge is added to the data association model, the association relationship diagram may be obtained. The association relationship diagram includes a plurality of nodes and at least one directed edge, each node indicates one piece of data, each directed edge includes one source node and one destination node, the directed edge points from the source node of the directed edge to the destination node of the directed edge, and each directed edge is used to indicate an operation request for obtaining, through calculation based on data indicated by the source node of the directed edge, data indicated by the destination node of the directed edge, so that a data flow and an operation flow can be combined, and an association relationship between the data and the operation request can be represented.

Abstract modeling may be performed based on the data processing record, to obtain a directed acyclic graph (DAG) model, and then the association relationship diagram is constructed based on the DAG model and the operation request record.

In one embodiment, considering that because a plurality of operation requests may have same input data and same output data, a same directed edge may be added to the data association model, so that the plurality of operation requests may be aggregated on a same node based on a topology structure of the nodes in the data association model, to form an initial association relationship diagram, and then a quantity of requests and a weight are set for each directed edge in the association relationship diagram. The quantity of requests indicates a quantity of operation requests corresponding to the directed edge, and the weight indicates execution frequency of the operation request corresponding to the directed edge, and the execution frequency of the operation request corresponding to the directed edge may be determined based on execution frequency of the operation request in the operation request record.

Figure 6:
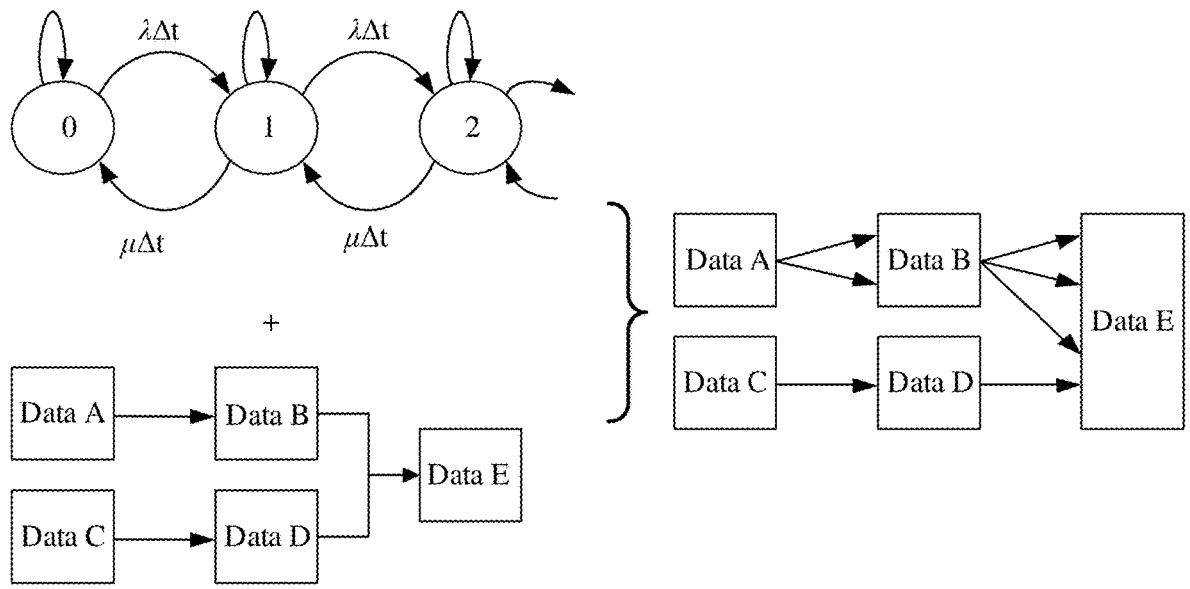
FIG. 6 is a schematic flowchart of creating an association relationship diagram according to an embodiment of this disclosure.

For example, referring to FIG. 6, a Markov chain is created based on the operation request record. In the Markov chain, different states of a scheduling queue are used as different nodes. A quantity in each node indicates a quantity of operation requests in the scheduling queue, λ indicates an arrival rate of the operation request, μ indicates a processing rate of the operation request, Δt indicates a time interval between different states, and the Markov chain may indicate an operation flow. In addition, a data association diagram is generated. In the data association diagram, different data is used as different nodes, and an edge between nodes indicates an operation request for obtaining, through calculation by using data corresponding to a source node, data corresponding to a destination node. The association relationship diagram may be generated based on the Markov chain and the data association diagram. In the association relationship diagram, different data is used as different nodes, and directed edges corresponding to different operation requests are connected to a same node. Each directed edge has a weight, and the weight is used to indicate execution efficiency corresponding to the operation request.

According to the method provided in this embodiment of this disclosure, the association relationship diagram may be generated based on the operation request record and the data processing record. The association relationship diagram can indicate a cross-layer dependency relationship between an operation layer and a platform layer, and has both a static feature of a data flow and a dynamic feature of an operation flow. When scheduling is performed based on the association relationship diagram, a sorting policy of the operation requests and a data distribution status can be fully considered, so that a proper scheduling policy is formulated, thereby reducing an operation execution time, improving calculation efficiency, and improving performance of a cloud computing system.

It should be noted that, in this embodiment of this disclosure, the scheduler may update the log record, and update the association relationship diagram based on an updated log record. The update process includes: determining a plurality of updated operation requests and execution frequency of each updated operation request based on an updated operation request record, where the plurality of updated operation requests may be remaining operation requests after the operation request that has been completely executed is removed, and execution frequency of some remaining operation requests may be changed because the operation requests have been executed in the current operation execution process. Therefore, the execution frequency needs to be updated, or after the current operation execution process ends, the plurality of updated operation requests may be operation requests that need to be executed in a next operation execution process. Then the directed edges in the association relationship diagram are updated based on the plurality of updated operation requests, request data of each directed edge is updated, and the weight of each directed edge is updated based on the execution frequency of each updated operation request.

The foregoing update process may be performed periodically, or performed after each operation execution process ends. For example, when a current period ends but the current operation execution process does not end, and there is an operation request that is not executed completely, the operation request and the execution frequency in the operation request record are updated, and the operation request record is read again, the weight of the directed edge in the association relationship diagram is updated, and an updated association relationship diagram is applied to a remaining execution process. Then, when the current operation execution process ends, the association relationship diagram is updated based on an execution status of each operation request in the current operation execution process.

Figure 7:
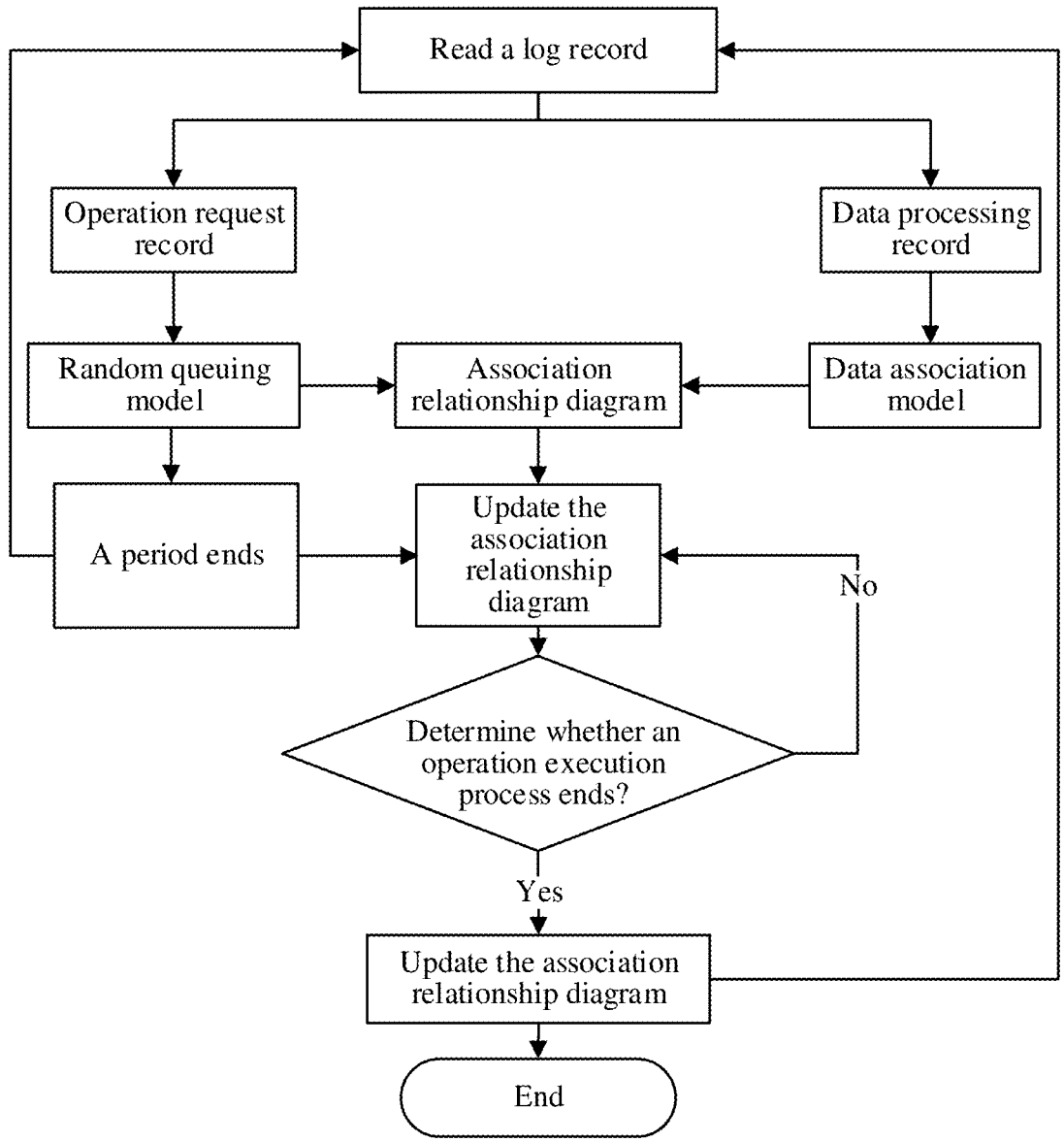
FIG. 7 is a schematic diagram of a process of generating and updating an association relationship diagram according to an embodiment of this disclosure.

A process of generating and updating the association relationship diagram may be shown in FIG. 7. The association relationship diagram is periodically updated during entire operation execution by using the foregoing update process, so that directed edge information of the cross-layer association relationship diagram can be updated in time as scheduling is performed, to respond to a burst status of the operation request in a more timely manner. A validity period of an updated weight of each directed edge is an update period, and the scheduler considers that an operation flow of each application remains unchanged in the validity period.

Figure 8:
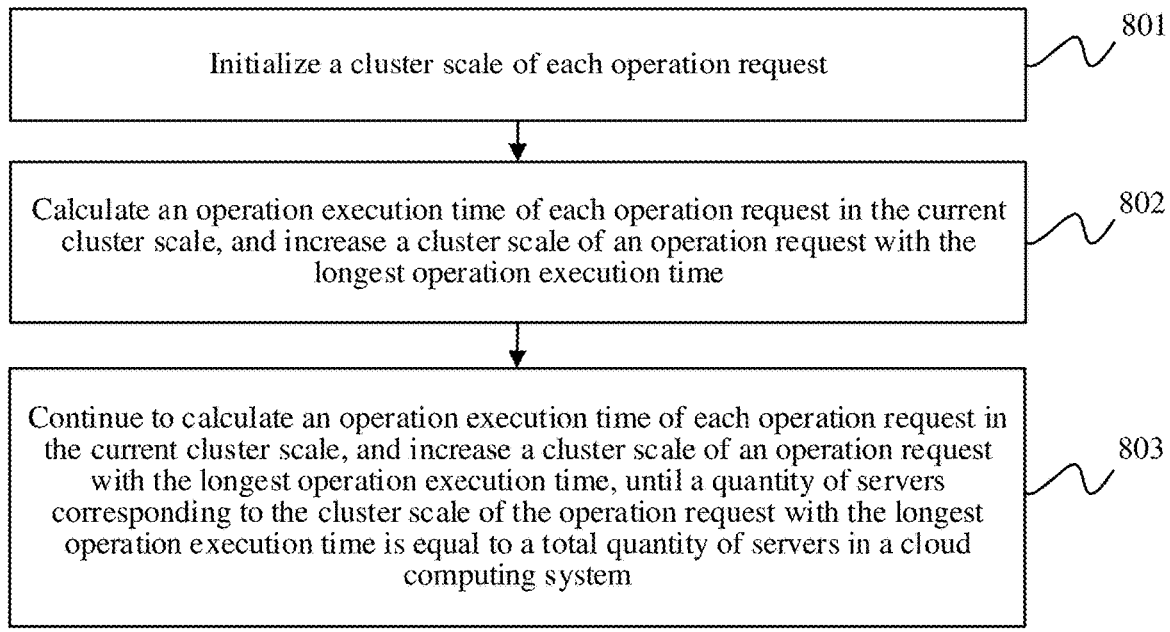
FIG. 8 is a flowchart of a scheduling method according to an embodiment of this disclosure.

FIG. 8 is a flowchart of a scheduling method according to an embodiment of this disclosure. The scheduling method is applied to the scheduler shown in the foregoing embodiment. In this embodiment of this disclosure, a process of determining a cluster scale of an operation request is described, and the process of determining the cluster scale of the operation request may be performed when data is uploaded to a cloud computing system. Referring to FIG. 8, the method includes the following operations.

801: Initialize a cluster scale of each operation request.

A quantity of servers occupied by data corresponding to the operation request is positively correlated with the cluster scale of the operation request. For example, the quantity of servers occupied by the data corresponding to the operation request may be determined to be equal to the cluster scale, to be specific, the cluster scale is the quantity of servers occupied by the data corresponding to the operation request; or a cluster scale r may be used to represent a quantity of racks, and a quantity of servers included in each rack is k, so that the quantity of servers occupied by the data corresponding to the operation request is rk.

Data corresponding to each operation request may constitute a plurality of data replicas, and is separately deployed in a plurality of servers. When a quantity of the servers in which the plurality of data replicas are deployed is relatively large, cross-node data transmission may be reduced in an operation request execution process, to reduce an operation execution time of the operation request. Therefore, for each operation request, when the cluster scale is relatively large, the operation execution time is relatively short. From a global perspective, the operation execution time of each operation request needs to be comprehensively considered, to properly determine the cluster scale of each operation request.

Therefore, the scheduler may first initialize the cluster scale of each operation request, and then adjust cluster scales of some operation requests subsequently. For example, during initialization, the cluster scale of each operation request in the operation request record may be set to a first value, and the first value may be a positive integer, to be specific, may be 1 or another value.

802: Calculate an operation execution time of each operation request in the current cluster scale, and increase a cluster scale of an operation request with the longest operation execution time.

The scheduler may first simulate an execution process of each operation request based on the cluster scale of the operation request, to determine the operation execution time of each operation request in the current cluster scale. For the operation request with the longest operation execution time, the cluster scale of the operation request is increased, so that the operation execution time of the operation request can be reduced. When the cluster scale of the operation request is increased, 1 or another value may be added to the cluster scale of the operation request.

In one embodiment, the operation request may be divided into a map task, a shuffle task, and a reduce task. In this case, an execution process of the operation request includes execution processes of the foregoing three tasks, and the operation execution time of the operation request may be determined based on execution time of the foregoing three tasks. The scheduler may establish a performance model, and calculate the operation execution time of each operation request in the current cluster scale based on the performance model.

Parameters of the performance model are defined as follows:

S: a total size of input files, including the input files of a plurality of operation requests;
J: a set of the operation requests;
R: a total quantity of racks;
k: a quantity of servers in one rack;
B: a bandwidth of a server;
V: an over subscription ratio, which is used for cross-rack transmission;
$L_j(r)$: an operation execution time of a $j^{th}$ operation request (where the operation request is executed in r racks);
r: a quantity of racks allocated to the $j^{th}$ operation request, to be specific, a scale of a computing cluster;
$J_{ij}$: whether the $j^{th}$ operation request is deployed on an $i^{th}$ rack for execution;
Rj: indicating that the $j^{th}$ operation request is allocated to a corresponding rack, namely, a set of $(J_{1j}, J_{2j}, \ldots, J_{Rj})$.
$S_j^I$: a size of an input file of the $j^{th}$ operation request;
$S_j^S$: a size of a shuffle file of the $j^{th}$ operation request;
$S_j^O$: a size of an output file of the $j^{th}$ operation request;
$N_j^M$: a quantity of map tasks of the $j^{th}$ operation request;
$N_j^R$: a quantity of reduce tasks of the $j^{th}$ operation request;
$\mu_{map}$: single machine average processing efficiency of a map task; and
$\mu_{reduce}$: single machine average processing efficiency of a reduce task.

Each operation request may be considered as a MapReduce operation, including the map task, the shuffle task, and the reduce task. The execution time is determined by the execution time of three phases of the map task, the shuffle task, and the reduce task, to be specific:

$$L_j(r) = t_j^{map}(r) + t_j^{shuffle}(r) + t_j^{reduce}(r).$$

First, in the execution phase of the map task, assuming that in the $j^{th}$ operation request, a round quantity of the map task is $w_j^{map}(r)$, $$w_j^{map}(r) = \lceil N_j^M / rk \rceil \text{ and}$$

$$t_j^{map}(r) = w_{j}^{map}(r) \cdot \frac{S_j^I / N_j^M}{\mu_{map}} \approx \frac{S_j^I}{\mu_{map} \cdot rk},$$

where [●] represents a round-up operation.

Assuming that in the $j^{th}$ operation request, a round quantity of the reduce reduce task is $w_j^{reduce}(r)$, $$w_j^{reduce}(r) = \lceil N_j^R / rk \rceil \text{ and}$$

$$t_j^{reduce}(r) = w_j^{reduce}(r) \cdot \frac{S_j^S / N_j^R}{\mu_{reduce}} \approx \frac{S_j^S}{\mu_{reduce} \cdot rk}.$$

In the execution phase of the shuffle task, an execution time in each round depends on a longer one between an intra-rack transmission time and a cross-rack transmission time:

$$t_j^{shuffle}(r) = w_j^{reduce} \cdot \text{Max}\{t_j^{inter}(r), t_j^{intra}(r)\} \text{ and }$$
$$w_j^{reduce}(r) = \lceil N_j^R / rk \rceil.$$

In a cross-rack transmission scenario, each compute node has a proportion of (r−1)/r of data to be transmitted across racks. Therefore, a time required for a cross-rack transmission process is:

$$t_j^{inter}(r) = \frac{S_j^{iinter}(r)}{B/V} = \frac{(S_j^S / rk) \cdot (r-1)/r}{B/V} = \frac{S_j^S \cdot (r-1)V}{Br^2 k}.$$

In the cross-rack transmission scenario, each compute node has a proportion of 1/r of data that does not need to be transmitted across racks. Therefore, a time required for an intra-rack transmission process is:

$$t^{intra}(r) = \frac{S_j^{iinter}(r)}{B - B/V} \cdot \frac{k-1}{k} = \frac{(S_j^S / rk) \cdot (1/r)}{B - B/V} \cdot \frac{k-1}{k} = \frac{S_j^S V(k-1)}{k^2 r^2 B(V-1)}.$$

Therefore, in the execution phase of the shuffle task, a case in which the cross-rack transmission time plays a leading role is as follows:

$$\frac{S_j^S \cdot (r-1)V}{Br^2 k} \geq \frac{S_j^S V(k-1)}{k^2 r^2 B(V-1)} \Leftrightarrow$$
$$(r-1)V \geq \frac{V(k-1)}{Bk(V-1)}(k \approx k-1) \Leftrightarrow r \geq \left\lceil \frac{1}{B(V-1)} + 1 \right\rceil \approx 2.$$

To be specific, when the cluster scale is greater than one node, the cross-node transmission becomes a bottleneck of the execution phase of the shuffle task in the MapReduce operation request.

In combination with computing performance of the node, the operation execution time of the operation request in the cluster is quantized as follows:

$$L_j(r) = t_j^{map}(r) + t_j^{reduce}(r) + t_j^{shuffle}(r)$$
$$= \frac{S_j^I}{\mu_{map} \cdot rk} + \frac{S_j^O}{\mu_{reduce} \cdot rk} + \lceil N_j^R / rk \rceil \cdot \frac{S_j^S \cdot (r-1)V}{Br^2 k}$$
$$\approx \frac{S_j^I}{\mu_{map} \cdot rk} + \frac{S_j^O}{\mu_{reduce} \cdot rk} + \frac{N_j^R S_j^S V(r-1)}{k^3 r^2 B}.$$

To be specific, the scheduler may calculate the operation execution time of any operation request in the current cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B}.$$

When the operation execution time is an extremum value, the cluster scale is:

$$\frac{dL_j(r)}{dr} = 0 \Rightarrow \frac{1}{r} = \left( \frac{S_j^I}{\mu_{map} \cdot k} + \frac{S_j^O}{\mu_{reduce} \cdot k} + \frac{N_j^R S_j^S V}{Bk^3} \right) \cdot \frac{Bk^3}{2N_j^R S_j^S V}$$

$$r_j^{worst} = \frac{\mu_{map} \mu_{reduce} Bk^3}{Bk^2(\mu_{reduce} S_j^I + \mu_{map} S_j^O) + \mu_{map} \mu_{reduce} N_j^R S_j^S V} \cdot \frac{2N_j^R S_j^S V}{Bk^3} \approx$$

$$\left[ \frac{2\mu_{map} \mu_{reduce} N_j^R S_j^S V}{Bk^2(\mu_{reduce} S_j^I + \mu_{map} S_j^O) + \mu_{map} \mu_{reduce} N_j^R S_j^S V} \right] \approx 2.$$

To be specific, when the cluster scale is two racks, the operation execution time of the operation request is an extremum value, and a larger cluster scale indicates a shorter operation execution time of the operation request. Therefore, a preliminary conclusion obtained based on a performance modeling result is that, in consideration of both computing performance and communication performance of a MapReduce cluster, a larger cluster scale indicates a shorter execution time span of the MapReduce operation. The conclusion is used in an optimized adjustment operation for the cluster scale for subsequently designing a coordinated scheduling method. In addition, in an initial data distribution operation, the result of the performance model is also used.

803: Continue to calculate an operation execution time of each operation request in the current cluster scale, and increase a cluster scale of an operation request with the longest operation execution time, until a quantity of servers corresponding to the cluster scale of the operation request with the longest operation execution time is equal to a total quantity of servers in the cloud computing system.

After the cluster scale of the operation request with the longest operation execution time is increased, the operation execution time of the operation request is reduced. In this case, operation 802 is performed again, to be specific, the operation execution time of the operation request in the increased cluster scale is recalculated, and is compared with the operation execution time of another operation request in the current cluster scale, to re-determine an operation request with the longest operation execution time, and increase a cluster scale of the current operation request with the longest operation execution time, and the rest is deduced by analogy, until after the cluster scale of the current operation request with the longest operation execution time is increased, a quantity of servers corresponding to the cluster scale is equal to the total quantity of servers in the cloud computing system.

In a first embodiment, when the cluster scale is equal to the quantity of servers occupied by the data corresponding to the operation request, after the cluster scale of the current operation request with the longest operation execution time is increased, adjustment of the cluster scale is stopped when the cluster scale is equal to the total quantity of servers in the cloud computing system.

In a second embodiment, the cluster scale is the quantity r of racks occupied by the data corresponding to the operation request, the quantity of servers included in each rack is k, and the quantity of servers occupied by the data corresponding to the operation request is rk. In this case, after the cluster scale r of the current operation request with the longest operation execution time is increased, adjustment of the cluster scale is stopped when rk is equal to the total quantity of servers in the cloud computing system.

It should be noted that, in this embodiment of this disclosure, the server is used as a minimum unit of the compute node, and the server is deployed in the rack. In this case, the cluster scale is adjusted by using the server as a granularity or the cluster scale is adjusted by using the rack as a granularity. In other embodiments, the server may alternatively be deployed in another manner, so that the cluster scale may be adjusted by using another granularity, which may be specifically determined based on a deployment requirement.

Figure 9:
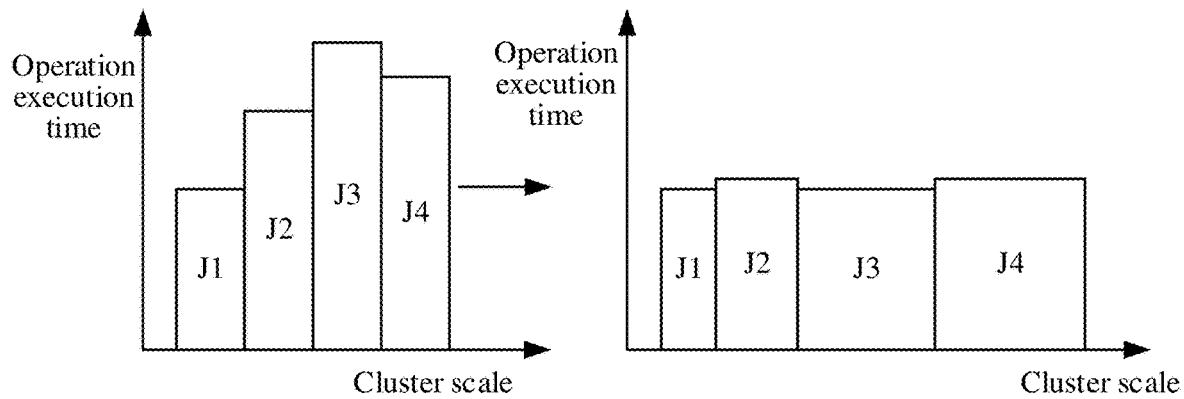
FIG. 9 is a schematic diagram of a relationship between a cluster scale and an operation execution time according to an embodiment of this disclosure.

In the foregoing cluster scale adjustment manner, a cluster scale of a current operation request with the longest operation execution time is continuously adjusted, so that a concurrency degree of the operation request can be increased, and the operation execution time of the operation request can be reduced. After repeated execution, it can be ensured that the operation execution time of all the operation requests is adjusted to approximately the same, as shown in FIG. 9.

Figure 10:
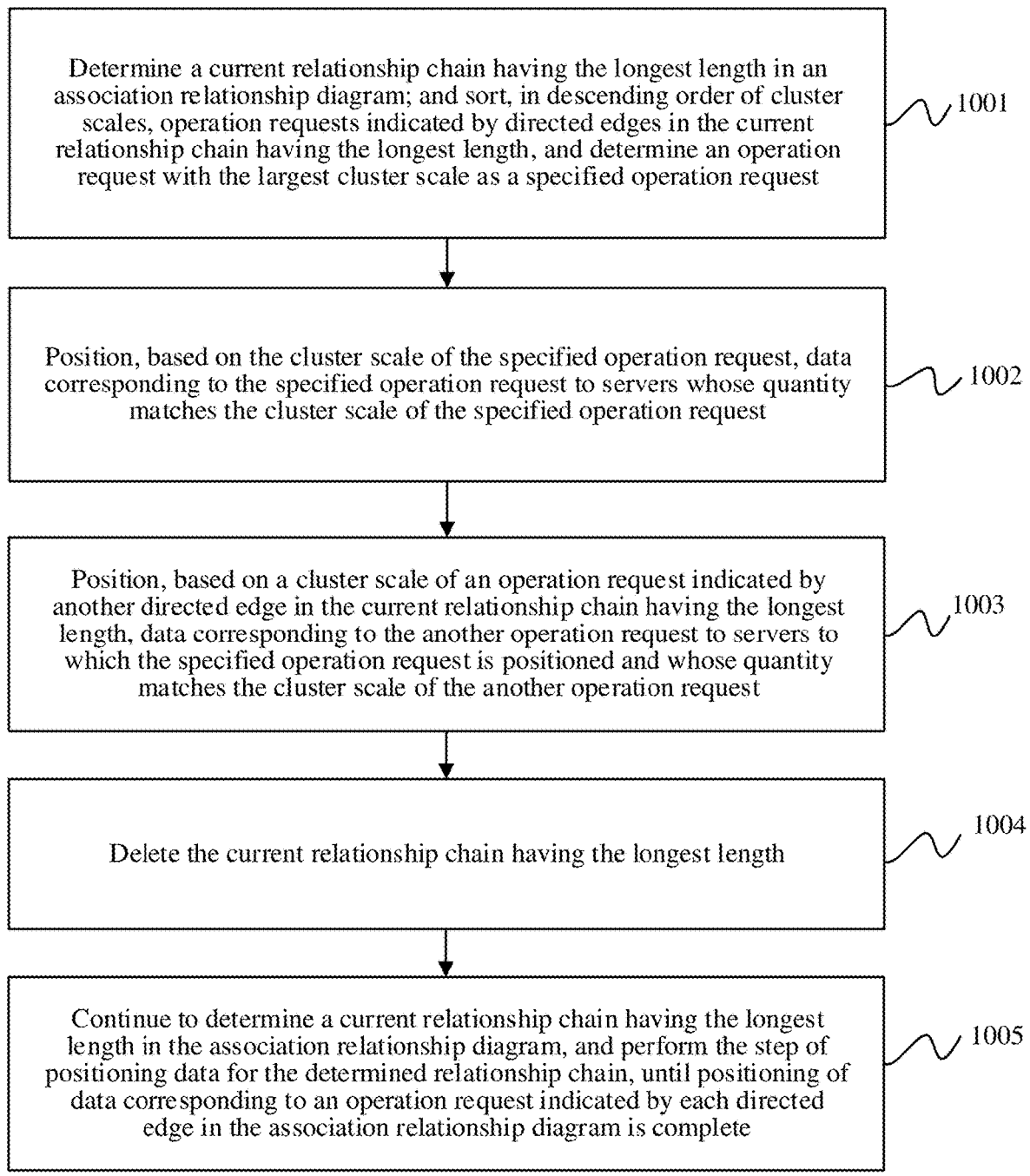
FIG. 10 is a flowchart of a scheduling method according to an embodiment of this disclosure.

FIG. 10 is a flowchart of a scheduling method according to an embodiment of this disclosure. The scheduling method is applied to the scheduler shown in the foregoing embodiment. In this embodiment of this disclosure, a data positioning process is described. The data positioning process may be performed after a cluster scale of an operation request is determined. Referring to FIG. 10, the method includes the following operations.

1001: Determine a current relationship chain having the longest length in an association relationship diagram; and sort, in descending order of cluster scales, operation requests indicated by directed edges in the current relationship chain having the longest length, and determine an operation request with the largest cluster scale as a specified operation request.

After the association relationship diagram is obtained and the cluster scale of each operation request is determined, a server to which each piece of data needs to be positioned, namely, a location in which each piece of data needs to be deployed may be determined.

In the association relationship diagram, a plurality of relationship chains may be obtained based on a node connection relationship. The relationship chain is a set including a first node and nodes and directed edges that are passed through by any second node to the first node; the first node is a node that has no directed edge using the first node as a source node; and the second node is a node that has at least two directed edges using the second node as a source node, or is a node that has a directed edge using the second node as a source node and has no directed edge using the second node as a destination node; and a length of each relationship chain is determined by a quantity of directed edges included in the relationship chain. After the first node and the second node in the association relationship diagram are determined, segmentation may be performed from the second node to obtain the plurality of relationship chains, the length of each relationship chain in the association relationship diagram, namely, the quantity of directed edges included in each relationship chain, is determined, and the current relationship chain having the longest length is determined. The current relationship chain having the longest length not only includes a plurality of nodes, but also includes directed edges between different nodes. These directed edges correspond to the operation requests. It may be considered that at least one operation request exists in the current relationship chain having the longest length, so that the operation requests are sorted in descending order of the cluster scales of all the operation requests, and the operation request with the largest cluster scale is determined as the specified operation request.

1002: Position, based on the cluster scale of the specified operation request, data corresponding to the specified operation request to servers whose quantity matches the cluster scale of the specified operation request.

After the specified operation request is determined, the quantity of servers matching the cluster scale of the specified operation request is determined, so that the data corresponding to the specified operation request is positioned to servers whose quantity is equal to the quantity of the matched servers.

The data positioning means determining a target server of the data and storing the data in the target server. In a subsequent data processing process, the target server may be used as a compute node to process the data, or the target server may send the data to another compute node, and the another compute node processes the data.

In a first embodiment, a cluster scale is equal to a quantity of servers occupied by data corresponding to an operation request. In this case, the data corresponding to the specified operation request is positioned to the servers whose quantity is equal to the cluster scale.

In a second embodiment, a cluster scale is a quantity r of racks occupied by data corresponding to an operation request, a quantity of servers included in each rack is k, and a quantity of servers occupied by the data corresponding to the operation request is rk. In this case, the data corresponding to the specified operation request is positioned to the r racks, to be specific, positioned to the rk servers.

1003: Position, based on a cluster scale of an operation request indicated by another directed edge in the current relationship chain having the longest length, data corresponding to the another operation request to servers to which the specified operation request is positioned and whose quantity matches the cluster scale of the another operation request.

After the data corresponding to the specified operation request is positioned, the data corresponding to the operation request indicated by the another directed edge in the current relationship chain having the longest length is positioned, and during positioning, data corresponding to each operation request is positioned to servers whose quantity matches the cluster scale. In addition, the data corresponding to each operation request should be preferentially positioned to the server to which the specified operation request is positioned. In one embodiment, the data corresponding to each operation request should be preferentially positioned to a server to which another positioned operation request in the relationship chain is positioned, to ensure that data corresponding to operation requests in a same relationship chain is positioned to a same server as much as possible.

Figure 11:
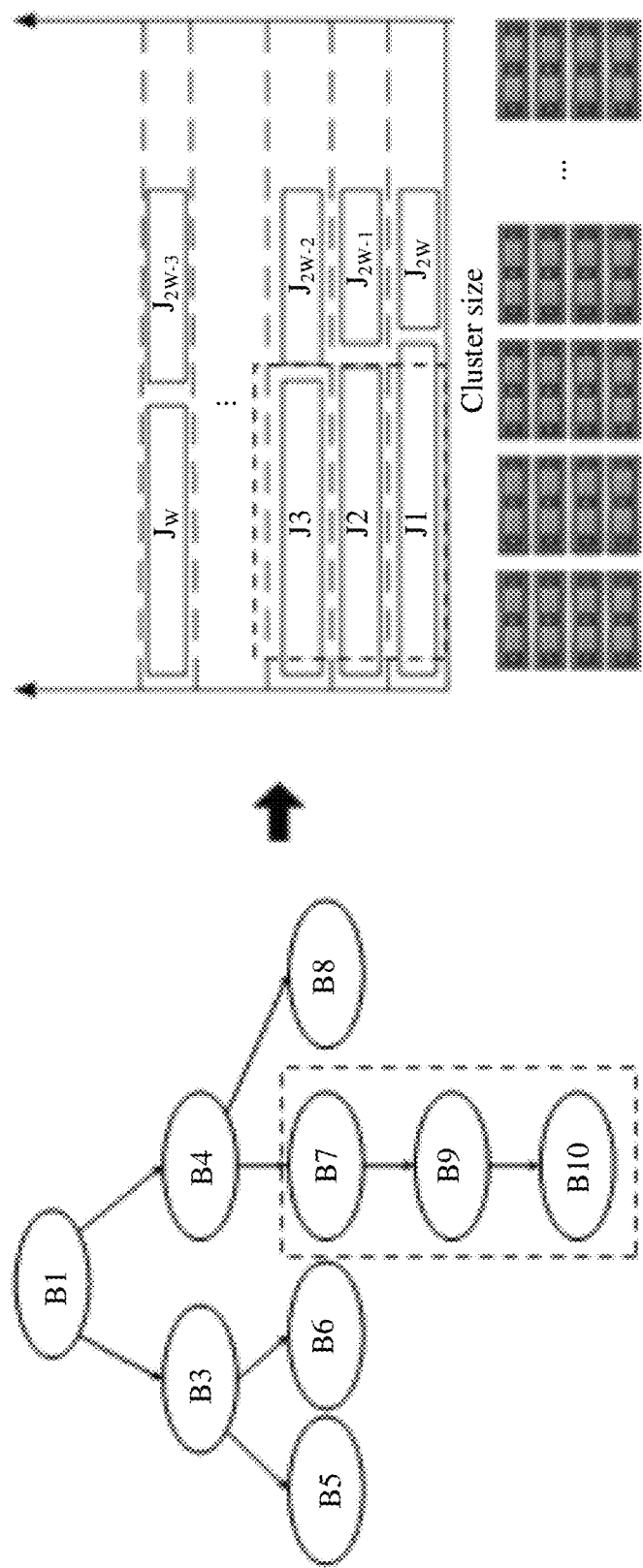
FIG. 11 is a schematic diagram of data positioning according to an embodiment of this disclosure.

For example, referring to FIG. 11, the relationship chain having the longest length in the association relationship diagram is "-B7-B9-B10". Three operation requests in the relationship chain are sequentially J1, J2, and J3. A cluster scale r1 of J1 is the largest, a cluster scale r2 of J2 is the second largest, and a cluster scale r3 of J3 is the smallest. In this case, data corresponding to J1 is positioned to r1 racks, data corresponding to J2 is positioned to r2 racks, and data corresponding to J3 is positioned to r3 racks. In addition, both the r2 racks and the r3 racks belong to some racks of the previously positioned r1 racks, and the r3 racks belong to some racks of the r2 racks. In this way, it can be ensured that the data corresponding to J1 and the data corresponding to J2 can be located on the same r2 racks, and the data corresponding to J1, the data corresponding to J2, and the data corresponding to J3 can be located on the same r3 racks.

1004: Delete the current relationship chain having the longest length.

1005: Continue to determine a current relationship chain having the longest length in the association relationship diagram, and perform the operation of positioning data for the determined relationship chain, until positioning of data corresponding to an operation request indicated by each directed edge in the association relationship diagram is complete.

After the data corresponding to the operation request indicated by the directed edge in the current relationship chain having the longest length is positioned, the relationship chain whose data is positioned may be deleted, and then it is determined whether a node corresponding to data that needs to be positioned still exists in an association relationship diagram obtained after the deletion. If the node corresponding to the data that needs to be positioned still exists, positioning is performed by continuing to repeat the foregoing operations based on the association relationship diagram obtained after the deletion, to be specific, a current relationship chain having the longest length in the association relationship diagram is re-determined, and data corresponding to an operation request indicated by a directed edge in the determined relationship chain is positioned, until the data corresponding to each operation request is positioned. In this case, there is no node corresponding to data that needs to be positioned, to be specific, locations of servers to which all the data is positioned are determined, so that final data distribution is complete, and data distribution information is obtained. The data distribution information includes a server in which each piece of data is located, thereby implementing initialization of the data distribution information.

In this embodiment of this disclosure, considering that data in a same relationship chain has an association relationship, the data may be used at the same time in an operation execution process. Therefore, the data that may be used at the same time is positioned to a same server by using the association relationship between the data, to facilitate subsequent data processing, so that data transmission between different servers is avoided as much as possible, communication overheads are optimized, and a waste of a communication capability is reduced. In addition, considering that the association relationship diagram includes a plurality of relationship chains, an association relationship is relatively complex, and a longer length of the relationship chain indicates higher complexity, and indicates greater impact of a data distribution status on overall system performance. Therefore, the relationship chains are sorted based on lengths of the relationship chains, and a relationship chain having the longest length is preferentially positioned, thereby reducing positioning complexity, and avoiding impact caused by improper data distribution on a subsequent data processing process as much as possible.

Figure 12:
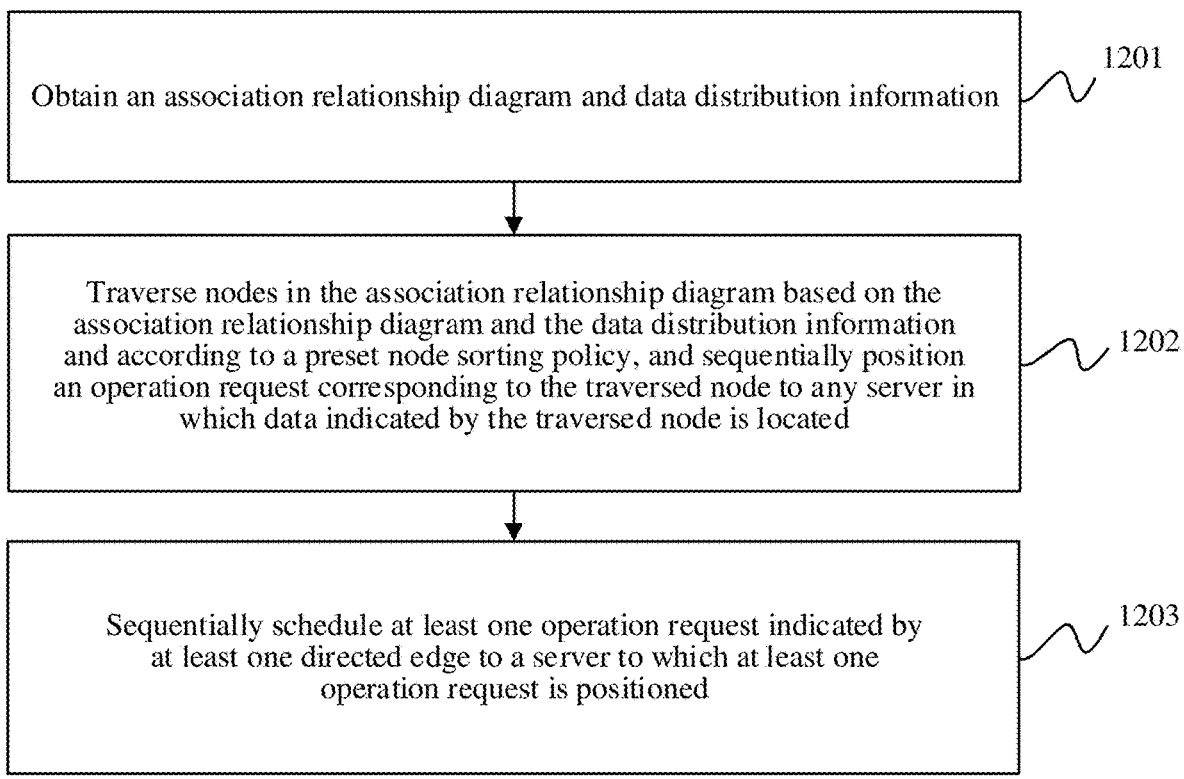
FIG. 12 is a flowchart of a scheduling method according to an embodiment of this disclosure.

FIG. 12 is a flowchart of a scheduling method according to an embodiment of this disclosure. The scheduling method is applied to the scheduler shown in the foregoing embodiment. In this embodiment of this disclosure, a process of scheduling an operation request is described, and the process of scheduling the operation request may be performed after data distribution information is determined. Referring to FIG. 12, the method includes the following operations.

1201: Obtain an association relationship diagram and data distribution information.

The association relationship diagram includes a plurality of nodes and at least one directed edge, each node indicates one piece of data, each directed edge includes one source node and one destination node, the directed edge points from the source node of the directed edge to the destination node of the directed edge, and each directed edge is used to indicate an operation request for obtaining, through calculation based on data indicated by the source node of the directed edge, data indicated by the destination node of the directed edge.

The data distribution information includes a server in which each piece of data is located. For example, the data distribution information may include an identifier of the server in which each piece of data is located. The identifier of the server is used to uniquely determine the corresponding server, and may be address information, a sequence number, or the like of the server.

1202: Traverse nodes in the association relationship diagram based on the association relationship diagram and the data distribution information and according to a preset node sorting policy, and sequentially position an operation request corresponding to a traversed node to any server in which data indicated by the traversed node is located, where the operation request corresponding to the node is an operation request indicated by a directed edge using the node as a source node.

The scheduler may set the preset node sorting policy, may sort the nodes in the association relationship diagram according to the preset node sorting policy, and may sequentially position, based on the ranking order, operation requests corresponding to the nodes. The positioning the operation request means determining a compute node of the operation request in a plurality of servers of a cloud computing system. The compute node is configured to execute the operation request, to be specific, process data corresponding to the operation request based on the operation request.

During positioning, the nodes are traversed in the ranking order of the nodes that is determined according to the preset node sorting policy. An operation request indicated by a directed edge using a node traversed each time as a source node is an operation request that needs to be positioned currently. In this case, the data distribution information has indicated a server in which data indicated by the traversed node is located, and the data needs to be used during execution of the operation request. Therefore, to avoid data transmission between different servers as much as possible, the operation request is positioned to any server in which the data is located. In the foregoing positioning manner, a server to which each operation request is positioned, namely, a compute node of each operation request can be determined.

In one embodiment, the preset node sorting policy is a policy of performing sorting in descending order of degrees, the degree is a quantity of directed edges connected to a node. When positioning is performed, a degree of each node in the association relationship diagram is determined first, and the nodes are sorted in descending order of the degrees, to determine a current node with the largest degree, to be specific, a traversed node. An operation request corresponding to the traversed node is positioned to any server in which data indicated by the traversed node is located. A directed edge using the traversed node as a source node is deleted, and then the foregoing operations are repeatedly performed. An operation request corresponding to a node whose degree is greater than 1 continues to be positioned, to be specific, a next node continues to be traversed to in descending order of the degrees, and an operation request indicated by a directed edge using the traversed node as a source node is positioned to any server in which data indicated by the traversed node is located, and the directed edge using the traversed node as the source node is deleted, and the rest is deduced by analogy, until the degree of each node in the association relationship diagram is not greater than 1.

Figure 13:
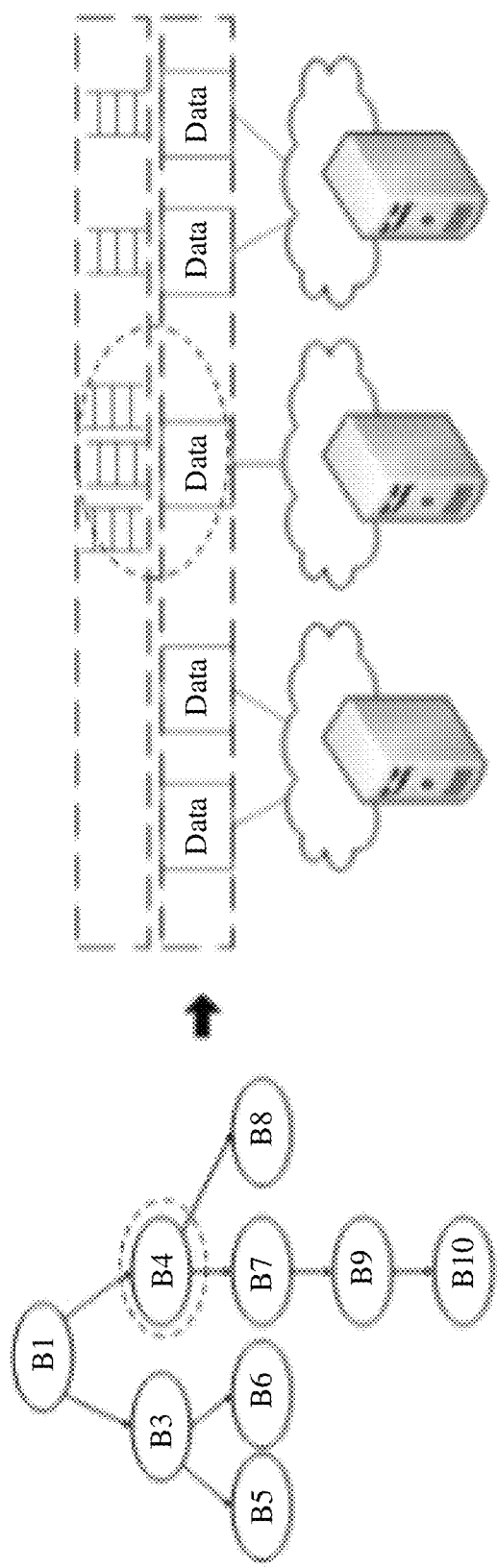
FIG. 13 is a schematic diagram of operation request positioning according to an embodiment of this disclosure.

For example, referring to FIG. 13, a degree of a node B4 in the association relationship diagram is the largest. In this case, two operation requests using the node B4 as a source node are preferentially positioned to a server in which data corresponding to the node B4 is located, and then an operation request corresponding to another node is positioned.

Considering that a node with a relatively large degree corresponds to a relatively large quantity of operation requests, and an association relationship is relatively complex, as many operation requests as possible can be positioned to a server in which data indicated by the node is located only after the node is preferentially positioned. Therefore, the nodes are sorted based on the degrees of the nodes, and an operation request corresponding to a node with the largest degree may be preferentially positioned, thereby reducing positioning complexity, completing one-to-one mapping between the operation request and the data, and avoiding impact caused by improper data distribution on a subsequent data processing process as much as possible.

1203: Sequentially schedule at least one operation request indicated by the at least one directed edge to a server to which the at least one operation request is positioned.

After the positioning is complete, each operation request may be sequentially scheduled to a server to which the operation request is positioned, to perform a corresponding operation request in the server to which the operation request is scheduled.

During scheduling, a plurality of policies may be used to determine a scheduling order of the operation requests, to determine an execution order of the operation requests. For example, a join the shortest queue (JSQ) policy is used for a big data application having a throughput priority, a shortest expected delay routing (SEDR) policy is used for a big data application having a response time priority, and a myopic max weight policy is used for a big data application having strong operation bursty.

After execution of any operation request is complete, if execution of all the operation requests in an operation request record is complete, scheduling of an operation flow is complete. However, if there is still an operation request that is not completely executed in the operation request record, the association relationship diagram is updated, and an updated association relationship diagram is applied to a subsequent scheduling process to continue scheduling and execution.

During updating, parameters such as an arrival rate and an execution rate of the operation request may be fed back, a weight of the directed edge in the association relationship diagram is updated, and a connection relationship between the node and the directed edge is corrected based on a node topology structure in the association relationship diagram. In addition, a server set used in a subsequent scheduling process, a period used in a scheduling process, or the like may further be updated based on an actual requirement.

According to the method provided in this embodiment of this disclosure, the association relationship diagram is used to indicate an association relationship between data and a correspondence between an operation request and the data, and the data distribution information is used to indicate a data distribution status, so that based on the association relationship diagram and the data distribution information, an operation request using a current node as a source node is positioned to any server in which data indicated by the current node is located. Therefore, cross-node data transmission can be reduced, thereby shortening an overall operation execution time of the operation request, improving calculation efficiency, and improving system performance.

In one embodiment, considering that when there are a plurality of operation requests, a plurality of rounds needs to be executed for completing execution of the plurality of operation requests, if at least two operation requests executed in each round need to be executed by a same server, load of the server is relatively large, and load of another server is relatively small. This causes a waste of a computing capability, and causes a decrease of execution efficiency. Therefore, an execution round of the operation request also affects the execution efficiency, and further affects system performance.

Therefore, when scheduling the plurality of operation requests, the scheduler may first determine an execution round of each operation request, and sequentially schedule, based on the execution round of each operation request, the at least one operation request to the server to which the at least one operation request is positioned, so that the plurality of operation requests may be executed in a plurality of rounds, and at least one operation request is executed in each round.

When the execution round of each operation request is determined, a quantity W of execution rounds required for completing execution of the plurality of operation requests in the operation request record may be calculated. The quantity W of execution rounds indicates a quantity of rounds that needs to be performed by the server for completing execution of all the operation requests in an ideal situation, and then, a priority degree of each operation request is calculated based on operation execution frequency and an operation execution time of each operation request, the plurality of operation requests are sorted in descending order of the priority degrees, and it is determined that execution rounds of an operation request ranking in the $(nW+m)^{th}$ and an operation request ranking in the $((n+2)W+1-m)^{th}$ are an $m^{th}$ round, to be specific, the operation request ranking in the $(nW+m)^{th}$ and an operation request ranking in the $((n+2)W+1-m)^{th}$ are set to be executed in the $m^{th}$ round, where m is a positive integer, m is not greater than W, and n is an integer.

The priority degree of the operation request is positively correlated with the operation execution frequency and the operation execution time, for example, may be a product of the operation execution efficiency and the operation execution time. Higher operation execution efficiency of an operation request indicates a higher priority degree, so that the operation request may be preferentially executed. However, a longer operation execution time of an operation request indicates that a longer time is required for completing processing of the operation request. In this case, a priority degree of the operation request is set to a relatively high value, to ensure that the operation request can be preferentially executed, even if execution of the operation request takes a relatively long time, the operation request can still be executed in parallel with other operation requests in the plurality of rounds subsequently, thereby avoiding prolonging an overall operation execution time.

In the foregoing manner, it can be ensured that a difference between priority degrees of operation requests executed in different rounds is not large, and after scheduling of the operation requests in each 2W rounds is complete, overall scales of the operation requests in all the rounds are approximately equal. Therefore, the operation requests are approximately tiled on all racks of the cloud computing system.

Figure 14:
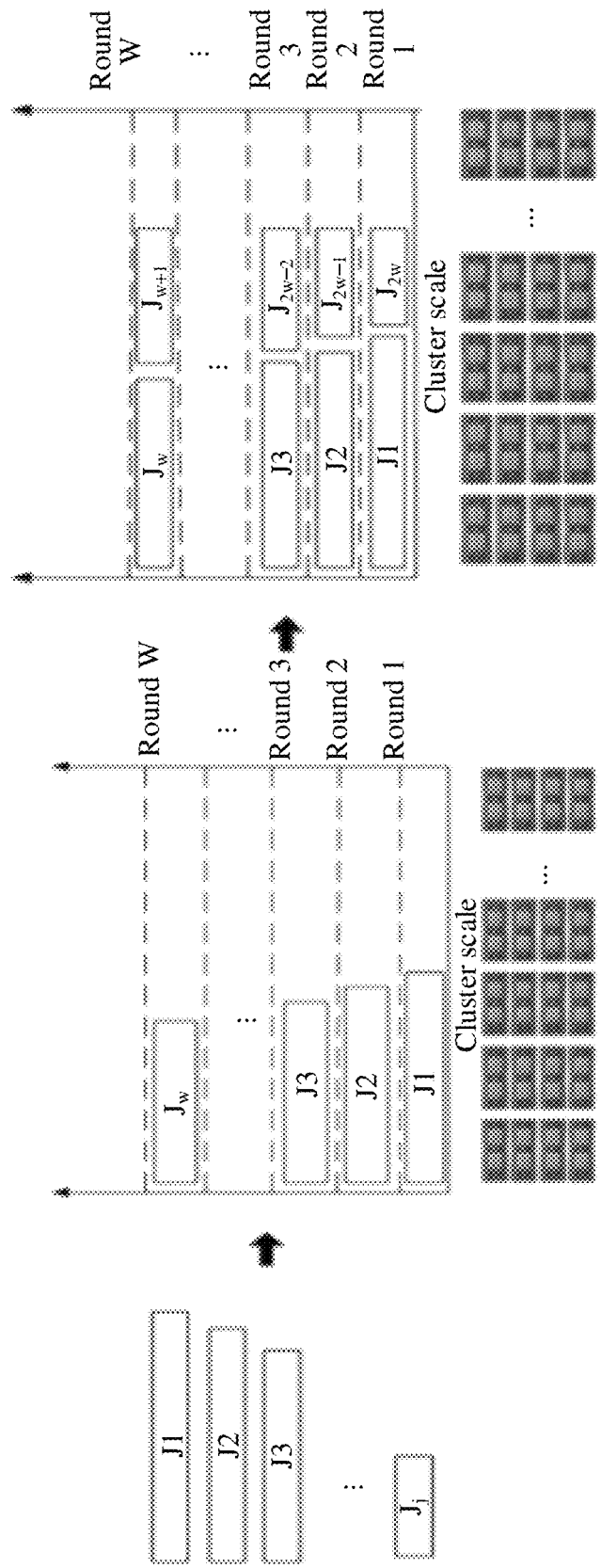
FIG. 14 is a schematic diagram of determining an execution round according to an embodiment of this disclosure.

Referring to FIG. 14, if priority degrees of J1, J2, . . . , and Jj are sequentially reduced, the first W operation requests J1 to JW are sequentially scheduled to the first round to the $W^{th}$ round, the $(JW+1)^{th}$ operation request to the $J2W^{th}$ operation request are sequentially scheduled to the $W^{th}$ round to the first round (reverse scheduling), and the rest is deduced by analogy. After scheduling of every 2W operation requests is complete, overall scales of the operation requests in all the rounds are approximately equal.

In this embodiment of this application, the execution round of each operation request is initialized by using a heuristic method, so that operation requests executed in parallel in each round can occupy all cluster capabilities, thereby avoiding a waste of the computing capability and improving the execution efficiency.

The method provided in the embodiments of this disclosure may include the following several operations.

1: Generate and update an association relationship diagram.
2: Determine a cluster scale of an operation request.
3: Adjust a data distribution status.
4: Position and schedule the operation request.
5: Feed back an operation and data.

Figure 15:
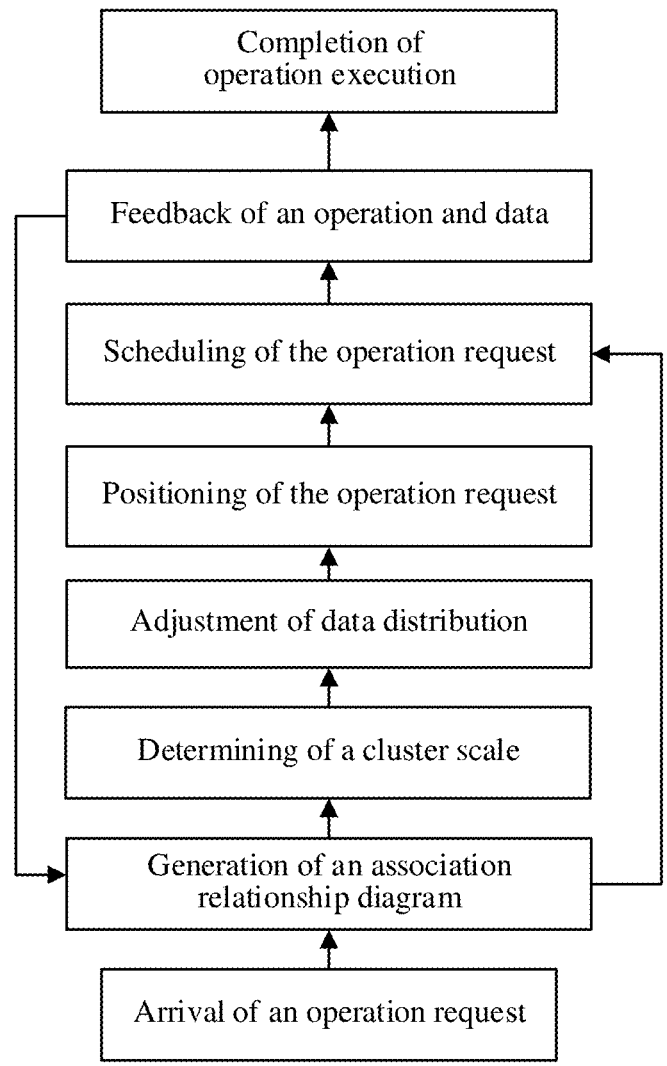
FIG. 15 is a flowchart of an operation according to an embodiment of this disclosure.

An operation flowchart of the method provided in this embodiment of this disclosure may be shown in FIG. 15. Referring to FIG. 15, after an association relationship diagram is generated for an arrived operation request, a cluster scale of each operation request is determined, a data distribution status is determined, and then the operation request is positioned and scheduled based on the association relationship diagram, the cluster scale of each operation request, and a location of corresponding data, so that the operation request is executed. Then, parameters such as execution frequency and an operation execution time in an execution process are fed back, so that the association relationship diagram is updated.

The foregoing operation 1 and operation 4 may be executed in the entire scheduling process until the scheduling ends, and real-time update of the association relationship diagram and real-time scheduling of an operation flow are mainly complete. However, operation 2 and operation 3 are performed only once at the beginning of the scheduling, to mainly complete scheduling of a data flow. Because redirection of the data flow causes high communication overheads, operation 2 and operation 3 should not be performed frequently. Operation 5 is triggered when operation execution ends, and is mainly for scheduling correction information for a next round. The five operations cooperate with each other, to finally implement coordinated scheduling of the operation flow and the data flow of a big data application.

The technical solutions in the embodiments of this disclosure introduce a cross-layer association relationship between a platform layer and an operation layer, to facilitate information integration between a data flow and an operation flow. Compared with a separate related-art solution and a simple combination of related-art solutions, the coordinated scheduling method in the embodiments of this disclosure can further optimize performance of the big data application.

Figure 16:
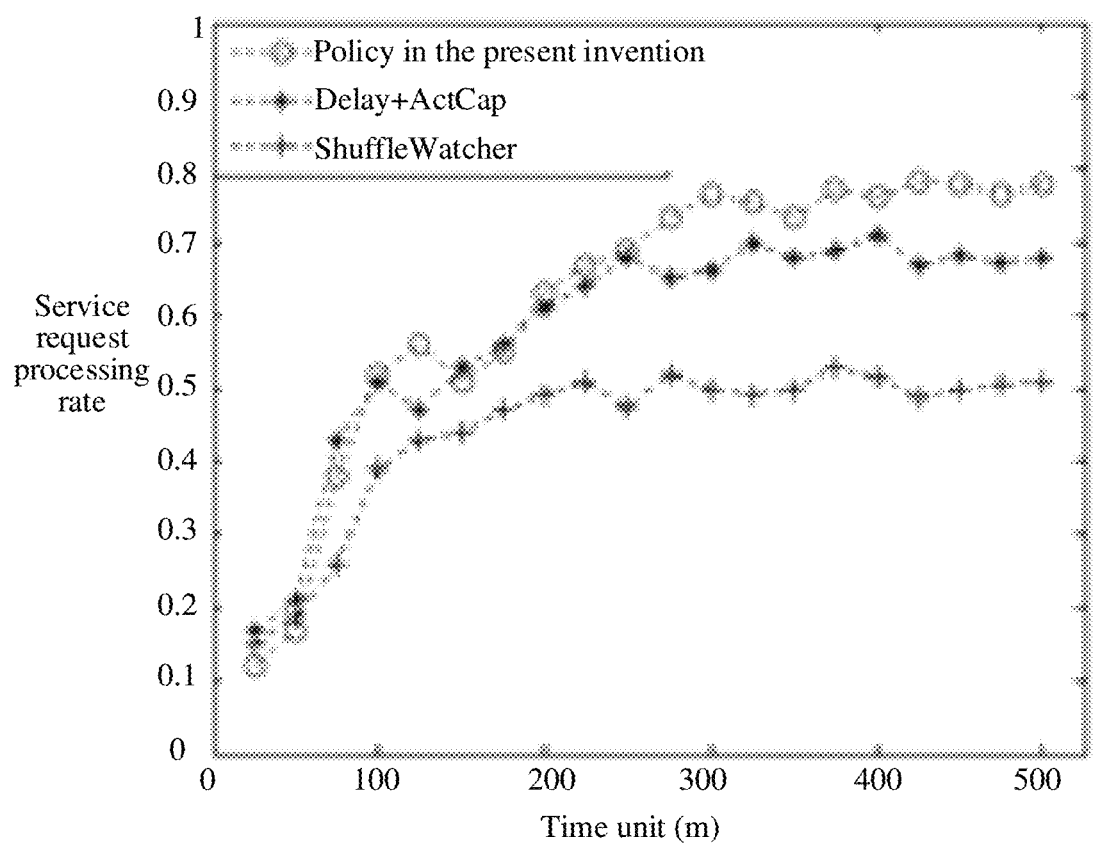
FIG. 16 is a schematic diagram of a change in an operation request completion proportion of a terminal user profile system in three solutions according to an embodiment of this disclosure.
Figure 17:
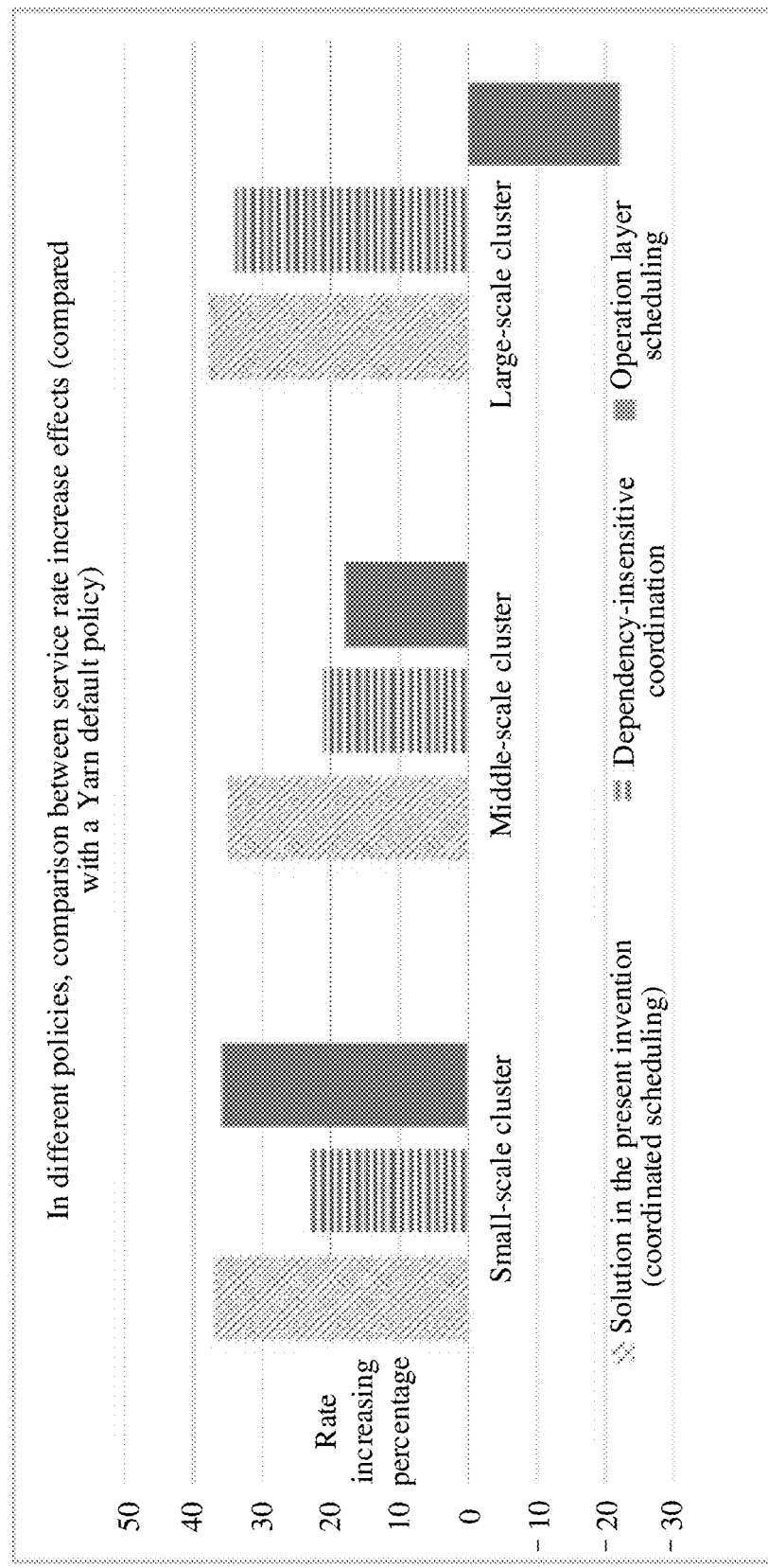
FIG. 17 is a schematic diagram of a change in a rate increasing percentage of a terminal user profile system in three solutions according to an embodiment of this disclosure.

FIG. 16 is a schematic diagram of a change in an operation request completion proportion of a terminal user profile system in three solutions according to an embodiment of this disclosure. FIG. 17 is a schematic diagram of a change in a rate increasing percentage of a terminal user profile system in three solutions according to an embodiment of this disclosure.

The three solutions include: the solution in the embodiments of this disclosure, a solution in which an operation layer uses a delayed scheduling policy and a platform layer uses the ActCap (which is a simple combination of an operation layer scheduling policy and a platform layer scheduling policy, and is insensitive to an association relationship between an operation request and data), and a ShuffleWatcher solution (where the platform layer scheduling policy is used).

It can be learned from FIG. 16 that, because both an operation flow and a data flow are considered, compared with the other two solutions, according to the scheduling policy in the embodiments of this disclosure, an operation request completion status is relatively good, and both a data flow and an operation flow are optimized and scheduled. A cross-layer association relationship is further introduced in the scheduling policy in the embodiments of this disclosure, so that coordinated integration of the operation flow and the data flow is optimized, and global resources are more properly used. Therefore, a platform resource in a higher priority accommodates more operation requests.

It can be learned from FIG. 17 that, in the scheduling policy of the embodiments of this disclosure, a cross-layer association relationship is further introduced, so that coordinated integration of an operation flow and a data flow is optimized. Therefore, a big data operation obtains a better rate increase effect, and integration of global resources on a platform is further optimized. In this way, the terminal user profile system obtains an optimal performance rate increase effect.

Figure 18:
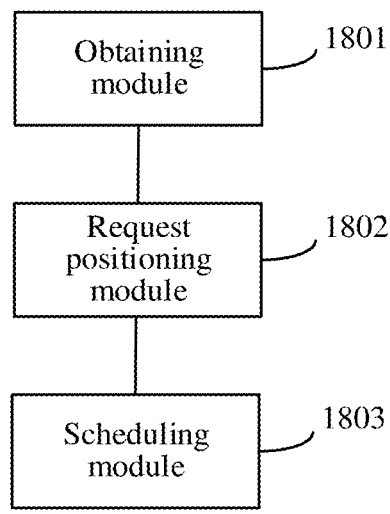
FIG. 18 is a schematic structural diagram of a scheduler according to an embodiment of this disclosure.

FIG. 18 is a schematic structural diagram of a scheduler according to an embodiment of this disclosure. Referring to FIG. 18, the scheduler is applied to the cloud computing system shown in the foregoing embodiments, and the scheduler includes:

an obtaining module 1801, configured to obtain an association relationship diagram and data distribution information, where the association relationship diagram includes a plurality of nodes and at least one directed edge, each node indicates one piece of data, each directed edge includes one source node and one destination node, the directed edge points from the source node of the directed edge to the destination node of the directed edge, the directed edge is used to indicate an operation request for obtaining, through calculation based on data indicated by the source node of the directed edge, data indicated by the destination node of the directed edge, and the data distribution information includes a server in which each piece of data is located;

a request positioning module 1802, configured to: traverse nodes in the association relationship diagram based on the association relationship diagram and the data distribution information and according to a preset node sorting policy, and sequentially position an operation request corresponding to a traversed node to any server in which data indicated by the traversed node is located, where the operation request corresponding to the node is an operation request indicated by a directed edge using the node as a source node; and a scheduling module 1803, configured to sequentially schedule at least one operation request indicated by the at least one directed edge to a server to which the at least one operation request is positioned.

In one embodiment, the preset node sorting policy is a policy of performing sorting in descending order of degrees, the degree is a quantity of directed edges connected to a node, and the request positioning module 1802 includes:

a determining unit, configured to: traverse the nodes in the association relationship diagram according to the preset node sorting policy, and determine a current node with the largest degree in the association relationship diagram as the traversed node;

a positioning unit, configured to position an operation request corresponding to the traversed node to any server in which data indicated by the traversed node is located; and a deletion unit, configured to delete a directed edge using the traversed node as a source node, where the determining unit, the positioning unit, and the deletion unit are further configured to: continue to traverse nodes in the association relationship diagram according to the preset node sorting policy, determine a current node with the largest degree in the association relationship diagram as the traversed node, and perform the operation of positioning an operation request and the operation of deleting a corresponding directed edge for the traversed node until a degree of each node in the association relationship diagram is not greater than 1.

In another embodiment, the scheduler further includes:

a log obtaining module, configured to obtain a log record, where the log record includes an operation request record and a data processing record;

a model construction module, configured to: construct a random queuing model based on the operation request record, and determine input data and output data for each operation request in the operation request record based on the random queuing model; and a data association model construction module, configured to: construct a data association model based on the data processing record, where the data association model includes a plurality of nodes, and each node indicates one piece of data in the data processing record; and determine a source node corresponding to the input data and a destination node corresponding to the output data for each operation request, and add, to the data association model, a directed edge pointing from the source node to the destination node, to obtain the association relationship diagram.

In another embodiment, the scheduler further includes:

a round quantity calculation module, configured to calculate a quantity W of execution rounds required for completing execution of a plurality of operation requests in the operation request record;

a priority degree calculation module, configured to calculate a priority degree of each operation request based on operation execution frequency and an operation execution time of each operation request, where the priority degree is positively correlated with the operation execution frequency and the operation execution time; and a round determining module, configured to: sort the plurality of operation requests in descending order of the priority degrees, and determine that execution rounds of an operation request ranking in the $(nW+m)^{th}$ and an operation request ranking in the $((n+2)W+1-m)^{th}$ are an $m^{th}$ execution round, where m is a positive integer, m is not greater than W, and n is an integer, where the scheduling module is further configured to sequentially schedule, based on an execution round of each operation request, the at least one operation request to the server to which the at least one operation request is positioned.

In another embodiment, the scheduler further includes:

a cluster scale setting module, configured to initialize a cluster scale of each operation request, where a quantity of servers occupied by data corresponding to the operation request is positively correlated with the cluster scale of the operation request; and a cluster scale adjustment module, configured to: calculate an operation execution time of each operation request in the current cluster scale, and increase a cluster scale of an operation request with the longest operation execution time; and continue to calculate an operation execution time of each operation request in the current cluster scale, and increase a cluster scale of an operation request with the longest operation execution time, until a quantity of servers corresponding to the cluster scale of the operation request with the longest operation execution time is equal to a total quantity of servers in a cloud computing system.

In another embodiment, each operation request includes a map task, a shuffle task, and a reduce task, and the cluster scale adjustment module is further configured to calculate an operation execution time of any operation request in the current cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B},$$

where $L_j(r)$ represents an operation execution time of a $j^{th}$ operation request, r represents a quantity of racks currently allocated to the $j^{th}$ operation request, k represents a quantity of servers in a rack, $S_j^I$ represents a size of an input file of the $j^{th}$ operation request, $S_j^O$ represents a size of an output file of the $j^{th}$ operation request, $S_j^S$ represents a size of a shuffle file of the $j^{th}$ operation request, $\mu_{map}$ represents single machine average processing efficiency of a map task, $\mu_{reduce}$ represents single machine average processing efficiency of a reduce task, $N_j^R$ represents a quantity of reduce tasks of the $j^{th}$ operation request, V represents an over subscription ratio, and B represents a bandwidth of the server.

In another embodiment, the scheduler further includes:

a sorting module, configured to: determine a current relationship chain having the longest length in the association relationship diagram, where the relationship chain is a set including a first node and nodes and directed edges that are passed through by any second node to the first node; the first node is a node that has no directed edge using the first node as a source node; and the second node is a node that has at least two directed edges using the second node as a source node, or is a node that has a directed edge using the second node as a source node and has no directed edge using the second node as a destination node; and the length of the relationship chain is determined by a quantity of directed edges included in the relationship chain; and sort, in descending order of the cluster scales, operation requests indicated by directed edges in the current relationship chain having the longest length, and determine an operation request with the largest cluster scale as a specified operation request;

a data positioning module, configured to: position, based on the cluster scale of the specified operation request, data corresponding to the specified operation request to servers whose quantity matches the cluster scale of the specified operation request; and position, based on a cluster scale of an operation request indicated by another directed edge in the current relationship chain having the longest length, data corresponding to the another operation request to servers to which the specified operation request is positioned and whose quantity matches the cluster scale of the another operation request; and a deletion module, configured to delete the current relationship chain having the longest length, where the sorting module, the data positioning module, and the deletion module are further configured to: continue to determine a current relationship chain having the longest length in the association relationship diagram, and perform the operation of positioning data for the determined relationship chain, until positioning of data corresponding to an operation request indicated by each directed edge in the association relationship diagram is complete.

In another embodiment, the scheduler further includes:

an update module, configured to update the log record after the operation request is executed, where the log record includes the operation request record and the data processing record, where the update module is further configured to update the association relationship diagram based on an updated log record.

In another embodiment, a quantity of requests of each directed edge in the association relationship diagram indicates a quantity of corresponding operation requests, a weight of each directed edge indicates execution frequency of the corresponding operation request, and the update module includes:

a first update unit, configured to determine a plurality of updated operation requests and execution frequency of each updated operation request based on an updated operation request record;

a second update unit, configured to: update the directed edges in the association relationship diagram based on the plurality of updated operation requests, and update the quantity of requests of each directed edge; and a third update unit, configured to update the weight of each directed edge in the association relationship diagram based on the execution frequency of each updated operation request.

Figure 19:
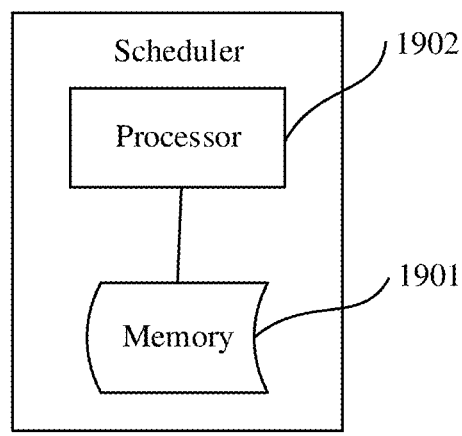
FIG. 19 is a schematic structural diagram of a scheduler according to an embodiment of this disclosure.

FIG. 19 is a schematic structural diagram of a scheduler according to an embodiment of this disclosure. Referring to FIG. 19, the scheduler is applied to the cloud computing system shown in the foregoing embodiments, and the scheduler includes a memory 1901 and a processor 1902. The memory 1901 is connected to the processor 1902, the memory 1901 stores at least one instruction, and the processor 1902 is configured to invoke the instruction to perform the operations performed by the scheduler in the foregoing embodiments.

An embodiment of this disclosure further provides a computer-readable storage medium. The computer-readable storage medium stores at least one instruction, and when the instruction is loaded and executed by a processor, the computer is enabled to perform the operations performed by the scheduler in the foregoing embodiments.

A person of ordinary skill in the art may understand that all or some of the operations of the embodiments may be implemented by hardware or a program instructing related hardware. The program may be stored in a computer-readable storage medium. The storage medium may include: a read-only memory, a magnetic disk, or an optical disc.

The foregoing descriptions are merely alternative embodiments of this disclosure, but are not intended to limit this disclosure. Any modification, equivalent replacement, or improvement made without departing from the spirit and principle of this disclosure should fall within the protection scope of this disclosure.

What is claimed is:

1. A scheduling method, comprising:

obtaining an association relationship diagram and data distribution information, wherein the association relationship diagram comprises a plurality of nodes and at least one directed edge, each node indicates one piece of data, each directed edge comprises one source node and one destination node, each said directed edge points from the source node to the destination node, each said directed edge is used to indicate an operation request for obtaining, through calculation based on data indicated by the source node, data indicated by the destination node, and the data distribution information comprises a server in which each piece of data is located;

traversing the nodes in the association relationship diagram based on the association relationship diagram and the data distribution information and according to a preset node sorting policy, and sequentially positioning an operation request corresponding to a traversed node to any server in which data indicated by the traversed node is located, wherein the operation request corresponding to the traversed node is an operation request indicated by a directed edge using the traversed node as a source node; and sequentially scheduling at least one operation request indicated by the at least one directed edge to a server to which the at least one operation request is positioned.

2. The method according to claim 1, wherein the preset node sorting policy is a policy of performing sorting in descending order of degrees, the degrees are a quantity of directed edges connected to the nodes, and the traversing the nodes in the association relationship diagram based on the association relationship diagram and the data distribution information and according to a preset node sorting policy, and sequentially positioning an operation request corresponding to a traversed node to any server in which data indicated by the traversed node is located comprises:

traversing the nodes in the association relationship diagram according to the preset node sorting policy, and determining a current node with the largest degree in the association relationship diagram as the traversed node;

positioning an operation request corresponding to the traversed node to any server in which data indicated by the traversed node is located;

deleting a directed edge using the traversed node as a source node; and iteratively performing the traversing the nodes in the association relationship diagram according to the preset node sorting policy, performing the determining a current node with the largest degree in the association relationship diagram as the traversed node, and performing the positioning an operation request and the deleting a corresponding directed edge for the traversed node until a degree of each node in the association relationship diagram is not greater than 1.

3. The method according to claim 1, wherein before the obtaining an association relationship diagram and data distribution information, the method further comprises:

obtaining a log record, wherein the log record comprises an operation request record and a data processing record;

constructing a random queuing model based on the operation request record, and determining input data and output data for each operation request in the operation request record based on the random queuing model;

constructing a data association model based on the data processing record, wherein the data association model comprises a plurality of nodes, and each node indicates one piece of data in the data processing record; and determining a source node corresponding to the input data and a destination node corresponding to the output data for each operation request; and adding, to the data association model, a directed edge pointing from the source node to the destination node, to obtain the association relationship diagram.

4. The method according to claim 1, wherein before the obtaining an association relationship diagram and data distribution information, the method further comprises:

calculating a quantity W of execution rounds required for completing execution of a plurality of operation requests in an operation request record;

calculating a priority degree of each operation request based on operation execution frequency and an operation execution time of each operation request, wherein the priority degree is positively correlated with the operation execution frequency and the operation execution time; and sorting the plurality of operation requests in descending order of the priority degrees, and determining that execution rounds of an operation request ranking in the (nW+m)th and an operation request ranking in the ((n+2)W+1−m)th are an mth execution round, wherein m is a positive integer, m is not greater than W, and n is an integer; and the sequentially scheduling at least one operation request indicated by the at least one directed edge to a server to which the at least one operation request is positioned comprises: sequentially scheduling, based on an execution round of each operation request, the at least one operation request to the server to which the at least one operation request is positioned.

5. The method according to claim 1, wherein the method further comprises:

initializing a cluster scale of each operation request, wherein a quantity of servers occupied by data corresponding to the operation request is positively correlated with the cluster scale of the operation request;

calculating an operation execution time of each operation request in the cluster scale, and increasing a cluster scale of an operation request with the longest operation execution time; and continuing to calculate an operation execution time of each operation request in the cluster scale, and increasing a cluster scale of an operation request with the longest operation execution time, until a quantity of servers corresponding to the cluster scale of the operation request with the longest operation execution time is equal to a total quantity of servers in a cloud computing system.

6. The method according to claim 5, wherein each operation request comprises a map task, a shuffle task, and a reduce task, and the calculating an operation execution time of each operation request in the cluster scale comprises:

calculating an operation execution time of any operation request in the cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B},$$

wherein $L_j(r)$ represents an operation execution time of a jth operation request, r represents a quantity of racks currently allocated to the jth operation request, k represents a quantity of servers in a rack, $S_j^I$ represents a size of an input file of the jth operation request, $S_j^O$ represents a size of an output file of the jth operation request, $S_j^S$ represents a size of a shuffle file of the jth operation request, $\mu_{map}$ represents single machine average processing efficiency of a map task, $\mu_{reduce}$ represents single machine average processing efficiency of a reduce task, $N_j^R$ represents a quantity of reduce tasks of the jth operation request, V represents an over subscription ratio, and B represents a bandwidth of the server.

7. The method according to claim 5, wherein after the continuing to calculate an operation execution time of each operation request in the cluster scale, and increasing a cluster scale of an operation request with the longest operation execution time, until a quantity of servers corresponding to the cluster scale of the operation request with the longest operation execution time is equal to a total quantity of servers in the cloud computing system, the method further comprises:

determining a current relationship chain having the longest length in the association relationship diagram, wherein a relationship chain is a set comprising a first node and nodes and directed edges that are passed through by any second node to the first node; the first node is a node that has no directed edge using the first node as a source node; and the second node is a node that has at least two directed edges using the second node as a source node, or is a node that has a directed edge using the second node as a source node and has no directed edge using the second node as a destination node; and a length of the relationship chain is determined by a quantity of directed edges comprised in the relationship chain;

sorting, in descending order of the cluster scales, operation requests indicated by directed edges in the current relationship chain having the longest length, and determining an operation request with the largest cluster scale as a specified operation request;

positioning, based on the cluster scale of the specified operation request, data corresponding to the specified operation request to servers whose quantity matches the cluster scale of the specified operation request; and positioning, based on a cluster scale of an operation request indicated by another directed edge in the current relationship chain having the longest length, data corresponding to another operation request to servers to which the specified operation request is positioned and whose quantity matches the cluster scale of the another operation request;

deleting the current relationship chain having the longest length; and iteratively performing the determining a current relationship chain having the longest length in the association relationship diagram, and performing the positioning data for the determined relationship chain, until positioning of data corresponding to an operation request indicated by each directed edge in the association relationship diagram is complete.

8. The method according to claim 1, wherein the method further comprises:

updating a log record after the operation request is executed, wherein the log record comprises an operation request record and a data processing record; and updating the association relationship diagram based on the updated log record.

9. The method according to claim 8, wherein a quantity of requests of each directed edge in the association relationship diagram indicates a quantity of corresponding operation requests, a weight of each directed edge indicates execution frequency of the corresponding operation request, and the updating the association relationship diagram based on an updated log record comprises:

determining a plurality of updated operation requests and execution frequency of each updated operation request based on an updated operation request record;

updating the directed edges in the association relationship diagram based on the plurality of updated operation requests, and updating the quantity of requests of each directed edge; and updating the weight of each directed edge in the association relationship diagram based on the execution frequency of each updated operation request.

10. A scheduler, comprising:

a processor; and a memory, wherein the memory stores at least one instruction, and the instruction is loaded and executed by the processor to implement operations performed in a method, the method comprising:

obtaining an association relationship diagram and data distribution information, wherein the association relationship diagram comprises a plurality of nodes and at least one directed edge, each node indicates one piece of data, each directed edge comprises one source node and one destination node, each said directed edge points from the source node to the destination node, each said directed edge is used to indicate an operation request for obtaining, through calculation based on data indicated by the source node, data indicated by the destination node, and the data distribution information comprises a server in which each piece of data is located;

traversing the nodes in the association relationship diagram based on the association relationship diagram and the data distribution information and according to a preset node sorting policy, and sequentially positioning an operation request corresponding to a traversed node to any server in which data indicated by the traversed node is located, wherein the operation request corresponding to the traversed node is an operation request indicated by a directed edge using the traversed node as a source node; and sequentially scheduling at least one operation request indicated by the at least one directed edge to a server to which the at least one operation request is positioned.

11. The scheduler according to claim 10, wherein the preset node sorting policy is a policy of performing sorting in descending order of degrees, the degrees are a quantity of directed edges connected to the nodes, and the traversing the nodes in the association relationship diagram based on the association relationship diagram and the data distribution information and according to a preset node sorting policy, and sequentially positioning an operation request corresponding to a traversed node to any server in which data indicated by the traversed node is located comprises:

traversing the nodes in the association relationship diagram according to the preset node sorting policy, and determining a current node with the largest degree in the association relationship diagram as the traversed node;

positioning an operation request corresponding to the traversed node to any server in which data indicated by the traversed node is located;

deleting a directed edge using the traversed node as a source node; and iteratively performing the traversing the nodes in the association relationship diagram according to the preset node sorting policy, performing the determining a current node with the largest degree in the association relationship diagram as the traversed node, and performing the positioning an operation request and the deleting a corresponding directed edge for the traversed node until a degree of each node in the association relationship diagram is not greater than 1.

12. The scheduler according to claim 10, wherein before the obtaining an association relationship diagram and data distribution information, the method further comprises:

obtaining a log record, wherein the log record comprises an operation request record and a data processing record;

constructing a random queuing model based on the operation request record, and determining input data and output data for each operation request in the operation request record based on the random queuing model;

constructing a data association model based on the data processing record, wherein the data association model comprises a plurality of nodes, and each node indicates one piece of data in the data processing record; and determining a source node corresponding to the input data and a destination node corresponding to the output data for each operation request; and adding, to the data association model, a directed edge pointing from the source node to the destination node, to obtain the association relationship diagram.

13. The scheduler according to claim 10, wherein before the obtaining an association relationship diagram and data distribution information, the method further comprises:

calculating a quantity W of execution rounds required for completing execution of a plurality of operation requests in the operation request record;

calculating a priority degree of each operation request based on operation execution frequency and an operation execution time of each operation request, wherein the priority degree is positively correlated with the operation execution frequency and the operation execution time; and sorting the plurality of operation requests in descending order of the priority degrees, and determining that execution rounds of an operation request ranking in the (nW+m)th and an operation request ranking in the ((n+2)W+1−m)th are an mth execution round, wherein m is a positive integer, m is not greater than W, and n is an integer; and the sequentially scheduling at least one operation request indicated by the at least one directed edge to a server to which the at least one operation request is positioned comprises: sequentially scheduling, based on an execution round of each operation request, the at least one operation request to the server to which the at least one operation request is positioned.

14. The scheduler according to claim 10, wherein the method further comprises:

initializing a cluster scale of each operation request, wherein a quantity of servers occupied by data corresponding to the operation request is positively correlated with the cluster scale of the operation request;
calculating an operation execution time of each operation request in the cluster scale, and increasing a cluster scale of an operation request with the longest operation execution time; and
continuing to calculate an operation execution time of each operation request in the cluster scale, and increasing a cluster scale of an operation request with the longest operation execution time, until a quantity of servers corresponding to the cluster scale of the operation request with the longest operation execution time is equal to a total quantity of servers in a cloud computing system.

15. The scheduler according to claim 14, wherein each operation request comprises a map task, a shuffle task, and a reduce task, and the calculating an operation execution time of each operation request in the cluster scale comprises:
calculating an operation execution time of any operation request in the cluster scale by using the following formula:

$$L_j(r) = \frac{S_j^I}{\mu_{map} \cdot rk} + \frac{S_j^O}{\mu_{reduce} \cdot rk} + \frac{N_j^R S_j^S V(r-1)}{k^3 r^2 B},$$

wherein
$L_j(r)$ represents an operation execution time of a jth operation request, r represents a quantity of racks currently allocated to the jth operation request, k represents a quantity of servers in a rack, $S_j^I$ represents a size of an input file of the jth operation request, $S_j^O$ represents a size of an output file of the jth operation request, $S_j^S$ represents a size of a shuffle file of the jth operation request, $\mu_{map}$ represents single machine average processing efficiency of a map task, $\mu_{reduce}$ represents single machine average processing efficiency of a reduce task, $N_j^R$ represents a quantity of reduce tasks of the jth operation request, V represents an over subscription ratio, and B represents a bandwidth of the server.

16. The scheduler according to claim 14, wherein after the continuing to calculate an operation execution time of each operation request in the cluster scale, and increasing a cluster scale of an operation request with the longest operation execution time, until a quantity of servers corresponding to the cluster scale of the operation request with the longest operation execution time is equal to a total quantity of servers in the cloud computing system, the method further comprises:
determining a current relationship chain having the longest length in the association relationship diagram, wherein the relationship chain is a set comprising a first node and nodes and directed edges that are passed through by any second node to the first node; the first node is a node that has no directed edge using the first node as a source node; and the second node is a node that has at least two directed edges using the second node as a source node, or is a node that has a directed edge using the second node as a source node and has no directed edge using the second node as a destination node; and the length of the relationship chain is determined by a quantity of directed edges comprised in the relationship chain;
sorting, in descending order of the cluster scales, operation requests indicated by directed edges in the current relationship chain having the longest length, and determining an operation request with the largest cluster scale as a specified operation request;
positioning, based on the cluster scale of the specified operation request, data corresponding to the specified operation request to servers whose quantity matches the cluster scale of the specified operation request; and positioning, based on a cluster scale of an operation request indicated by another directed edge in the current relationship chain having the longest length, data corresponding to another operation request to servers to which the specified operation request is positioned and whose quantity matches the cluster scale of the another operation request;
deleting the current relationship chain having the longest length; and
iteratively performing the determining a current relationship chain having the longest length in the association relationship diagram, and performing the positioning data for the determined relationship chain, until positioning of data corresponding to an operation request indicated by each directed edge in the association relationship diagram is complete.

17. The scheduler according to claim 10, wherein the method further comprises:
updating a log record after the operation request is executed, wherein the log record comprises an operation request record and a data processing record; and
updating the association relationship diagram based on the updated log record.

18. The scheduler according to claim 17, wherein a quantity of requests of each directed edge in the association relationship diagram indicates a quantity of corresponding operation requests, a weight of each directed edge indicates execution frequency of the corresponding operation request, and the updating the association relationship diagram based on an updated log record comprises:
determining a plurality of updated operation requests and execution frequency of each updated operation request based on an updated operation request record;
updating the directed edges in the association relationship diagram based on the plurality of updated operation requests, and updating the quantity of requests of each directed edge; and
updating the weight of each directed edge in the association relationship diagram based on the execution frequency of each updated operation request.

19. A non-transitory computer-readable storage medium, wherein the non-transitory computer-readable storage medium stores at least one instruction, and the instruction is loaded and executed by a processor to implement operations performed in a method, the method comprising:
obtaining an association relationship diagram and data distribution information, wherein the association relationship diagram comprises a plurality of nodes and at least one directed edge, each node indicates one piece of data, each directed edge comprises one source node and one destination node, each said directed edge points from the source node to the destination node, each said directed edge is used to indicate an operation request for obtaining, through calculation based on data indicated by the source node, data indicated by the destination node, and the data distribution information comprises a server in which each piece of data is located;
traversing the nodes in the association relationship diagram based on the association relationship diagram and the data distribution information and according to a preset node sorting policy, and sequentially positioning an operation request corresponding to a traversed node to any server in which data indicated by the traversed node is located, wherein the operation request corresponding to the traversed node is an operation request indicated by a directed edge using the traversed node as a source node; and sequentially scheduling at least one operation request indicated by the at least one directed edge to a server to which the at least one operation request is positioned.

20. The non-transitory computer-readable storage medium according to claim 19, wherein the preset node sorting policy is a policy of performing sorting in descending order of degrees, the degrees are a quantity of directed edges connected to the nodes, and the traversing the nodes in the association relationship diagram based on the association relationship diagram and the data distribution information and according to a preset node sorting policy, and sequentially positioning an operation request corresponding to a traversed node to any server in which data indicated by the traversed node is located comprises:

traversing the nodes in the association relationship diagram according to the preset node sorting policy, and determining a current node with the largest degree in the association relationship diagram as the traversed node;

positioning an operation request corresponding to the traversed node to any server in which data indicated by the traversed node is located;

deleting a directed edge using the traversed node as a source node; and iteratively performing the traversing the nodes in the association relationship diagram according to the preset node sorting policy, performing the determining a current node with the largest degree in the association relationship diagram as the traversed node, and performing the positioning an operation request and the deleting a corresponding directed edge for the traversed node until a degree of each node in the association relationship diagram is not greater than 1.

\* \* \* \* \*